United States Patent [19]

Merhav

[11] Patent Number: 4,590,801
[45] Date of Patent: May 27, 1986

[54] APPARATUS FOR MEASURING INERTIAL SPECIFIC FORCE AND ANGULAR RATE OF A MOVING BODY

[75] Inventor: Shmuel J. Merhav, Haifa, Israel

[73] Assignee: Sundstrand Data Control, Inc., Redmond, Wash.

[21] Appl. No.: 737,919

[22] Filed: May 28, 1985

Related U.S. Application Data

[63] Continuation of Ser. No. 528,776, Sep. 2, 1983, abandoned, which is a continuation-in-part of Ser. No. 357,715, Mar. 12, 1982, abandoned.

[51] Int. Cl.$^4$ .......................... G01P 15/08; G01P 9/04
[52] U.S. Cl. ........................................ 73/510; 73/505; 73/517 R
[58] Field of Search ...................... 73/505, 510, 516 R, 73/517 B, 517 R

[56] References Cited

U.S. PATENT DOCUMENTS

| | | | |
|---|---|---|---|
| 2,544,646 | 3/1951 | Barnaby et al. | 73/505 |
| 2,552,722 | 5/1951 | King | 73/516 R |
| 2,554,512 | 5/1951 | Varian | 73/517 R |
| 3,113,223 | 12/1963 | Smith et al. | 310/329 |
| 3,744,322 | 7/1973 | Pacey et al. | 73/505 |
| 3,842,681 | 10/1974 | Mumme | 73/505 |

*Primary Examiner*—Stewart J. Levy
*Assistant Examiner*—John E. Chapman, Jr.
*Attorney, Agent, or Firm*—James A. Gabala; Ted E. Killingsworth; Harold A. Williamson

[57] ABSTRACT

Apparatus for measuring inertial specific force and angular rate of moving body by means of a plurality of accelerometers mounted on mutually perpendicular axes, each accelerometer being mounted for vibratory movement along its respective axis. The apparatus further includes a drive for vibrating each accelerometer to produce output signals and a signal processor for deriving from the accelerometer output signals the specific force and angular rate for the respective axes. Enhanced performance is achieved by utilizing pairs of accelerometers vibrating along each axis combined with a preseparation circuit that separates the components of the accelerometer output signal having specific force information from components having angular rate information.

62 Claims, 19 Drawing Figures

$p_x = \rho S \omega t$
$p_y = \rho S \omega t$
$p_z = \rho S \omega t$ $p_x = \rho S \omega t$
$p_y = \rho S \omega t$
$p_z = \rho S \omega t$

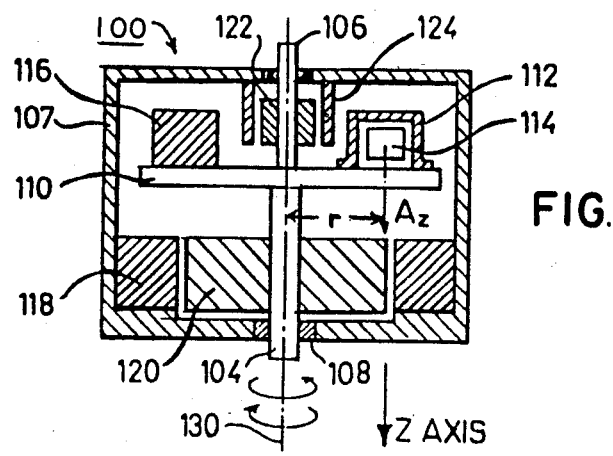
FIG. 7
FIG. 8
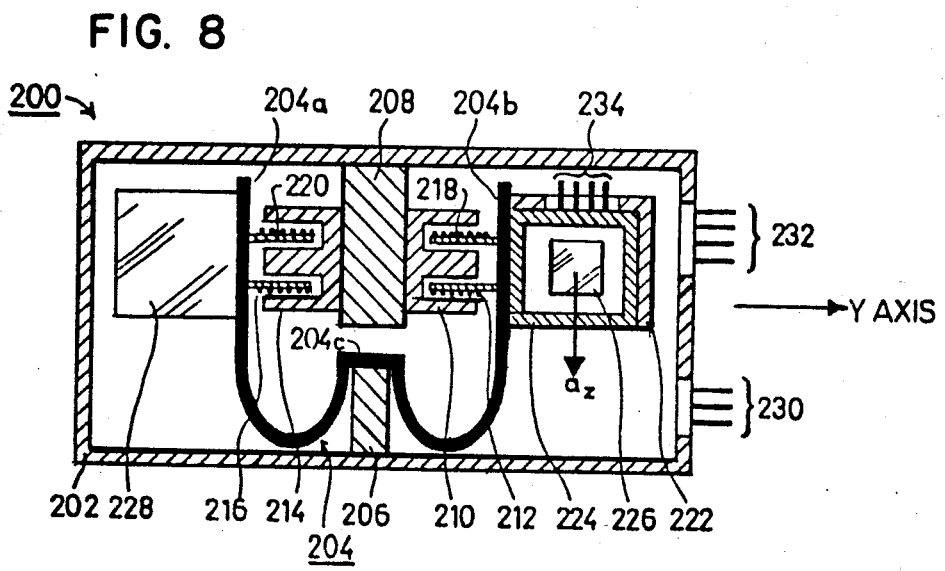
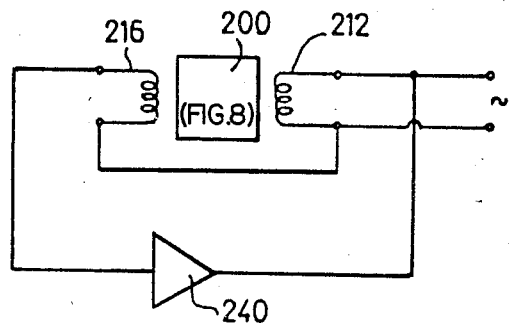
FIG. 9

APPARATUS FOR MEASURING INERTIAL SPECIFIC FORCE AND ANGULAR RATE OF A MOVING BODY

RELATED PATENT APPLICATION

This application is a continuation of U.S. patent application Ser. No. 528,776 which was filed on Sept. 2, 1983 and which is now abandoned. U.S. patent application Ser. No. 528,776 was a continuation-in-part of U.S. patent application Ser. No. 357,715 which was filed on Mar. 12, 1982 and is now abandoned.

This application relates to U.S. Pat. No. 4,445,376 (issued on May 1, 1984) and to co-pending U.S. patent application Ser. No. 737,913 (filed on May 28, 1985) which are directed to apparatus utilizing moving accelerometers to measure specific force and the angular rate of a moving body.

FIELD OF THE INVENTION

The present invention relates to apparatus for measuring the inertial specific force and angular rate of a moving body by means of a plurality of accelerometers mounted on mutually perpendicular axes. The invention is particularly useful in the apparatus and method as applied to a high-precision, nongyroscopic Inertial Measurement Unit (IMU) for an Inertial Navigation System (INS), as described in the copending patent application cited in the first paragraph of this specification as well as the article by Shmuel J. Merhav entitled "A Nongyroscopic Inertial Measurement Unit," published in the *AIAA J. of Guidance and Control*, May–June, 1982, pp. 227-235, and is therefore described below with respect to such an application.

The above-cited patent application discloses a method and apparatus for measuring the specific force vector and angular rate vector of a moving body by means of a plurality of cyclically driven accelerometers. The embodiment described therein uses rotating accelerometers which, broadly, had been proposed as early as 1965, but which had not yet matured as a practical technology as discussed in that patent application. That patent application was particularly directed to a novel manner of processing the accelerometer output signals so as to derive the specific force vector F and the angular rate vector $\Omega$ components thereof in such a manner that the unwanted components are suppressed to a sufficiently low level so as to be compatible with INS precision requirements. Briefly, the angular rate vector components of $\Omega$ (i.e., $\Omega_i$, wherein i=x, y, z) are derived from each of the accelerometer output signals ("a"), by: (1) multiplying the accelerometer output signal by the function sgncos ωt to produce the product signal a·sgncos ωt, and (2) integrating the product signal over the cyclic period. The specific force vector components of F (i.e., $F_i$ wherein i=x, y, z) are derived by integrating the respective accelerometer output signals ("a") over the cyclic period. That patent application includes a discussion and a mathematical analysis of the dynamics involved, and shows that a number of important advantages are obtained which make the described method and apparatus particularly suitable for nongyroscopic Inertial Navigation Systems (INS). Reference may be had to that patent application and the article by S. J. Merhav, cited above, for further details of the described technique for signal separation and of the advantages obtainable thereby.

An object of the present invention is to provide new apparatus for measuring the specific force and angular rate of a moving body enabling a number of further important advantages to be attained as will be described more particularly below. The apparatus of the present application is particularly useful with the technique of signal separation described in the above-cited patent application, and is therefore described below with respect to that technique, but it will be appreciated that the invention of the present application, or features thereof, could also be advantageously used in other applications.

BRIEF SUMMARY OF THE INVENTION

Briefly, the present invention provides apparatus for measuring the specific force and angular rate of a moving body by means of a plurality of accelerometers mounted on mutually perpendicular axes and cyclically driven by drive means in mutually perpendicular planes, characterized in that each accelerometer is mounted for vibratory movement and is driven by the drive means along an axis of vibration in its respective plane rather than being rotated in its plane, as in the embodiment of the invention described in the above-cited patent application.

Several arrangements constituting further features of the invention are described below for effecting the vibratory movement of the accelerometers.

Thus, in one described embodiment, the accelerometer is resiliently mounted by resilient means, such as a diaphragm, constraining the accelerometer to move only along the axis of vibration, the drive means being connectable to a source of sinusoidal current for vibrating the accelerometer along the axis of vibration. Each reference axis of the moving body may be provided with two such vibrating assemblies mounted in coaxial back-to-back relationship, the drive means of one vibrating its assembly in synchronism with, but in opposite direction to, the drive means of the other, whereby one assembly serves as a counterbalancing mass for dynamically balancing the other assembly.

Apparatus constructed in accordance with the foregoing features enables a number of important advantages to be attained, particularly when applied to nongyroscopic Inertial Navigation Systems (INS). Thus, it enables the accelerometers to be cyclically driven without rotating or sliding mechanical joints, thereby obviating the need for slip rings or other sliding electrical contacts. In addition, the described arrangement provides an accelerometer assembly which is inherently rigid along the sensitive axis which permits the vibratory motion to be imparted to the accelerometers at amplitudes, frequencies and phase angles that may be very precisely controlled, and which make the accelerometers substantially insensitive to external forces, shock and vibration. A still further advantage, particularly in the back-to-back arrangement, is that it generates the required vibratory motion in a manner such that the dynamical forces are precisely balanced. The foregoing advantages provide a much higher mean-time-between-failure (MTBF) than the gyro-type IMU's, or the nongyro-type IMU's having rotating accelerometers.

A second embodiment of the invention is described wherein each accelerometer is mounted on a supporting member rotatable about a rotational axis perpendicular to its axis of vibration, with the drive means oscillating its supporting member through a small angular motion about its rotational axis. The supporting member also includes a counterbalancing mass on the opposite side of its rotational axis for counterbalancing the accelerometer mass. In this described embodiment, the drive means comprises an electrical torque motor driven by the sinusoidal current to execute a small angular oscillatory motion (a few degrees) which is almost linear. This embodiment has the further advantages of substantially complete immunity to external linear vibration and shock, simplicity of construction, and high precision at low cost.

A third embodiment of the invention is described below including a tuning fork, which embodiment also permits precise balancing of the dynamical forces. Thus, the accelerometer includes a mass mounted for vibratory movement on a first prong of the tuning fork, the second prong of the tuning fork including a counterbalancing mass causing the two prongs to vibrate at a predetermined natural frequency. In this described embodiment, the electrical driving member is carried on one prong of the tuning fork, and the electrical pick-off member may be carried on the other prong. Such an arrangement can include an electrical feedback loop from the pick-off member to the drive member to form therewith an electromechanical oscillator whose oscillations are sustained by the feedback loop.

The tuning-fork embodiment provides, in addition to a balanced dynamical system because of countermoving masses, a number of additional advantages. Thus, since the power required to drive the driving member is only that needed to replenish the energy loss due to friction, the arrangement requires but a small amount of power. Further, since the device acts as a sharply tuned oscillator, it will reject mechanical disturbances along the sensitive axis unless they are exactly at the resonant frequency. Still further, since the arrangement operates at its natural frequency, it can be used to synchronize the multivibrator which controls the signal processor, thereby avoiding phase lags which might affect the accuracy of the angular rate and specific force vectors derived from the accelerometer output signals.

From the above, it will be appreciated that the "vibratory movement" applied to the accelerometers may not only be a pure rectilinear movement, such as in the first of the above-mentioned embodiments, but may also be a substantially rectilinear movement (e.g., small angular oscillatory motions which are almost rectilinear) such as in the second and third of the above-mentioned embodiments of the invention. This will be more apparent from the detailed description below of each of these three embodiments.

A further improvement to the rate and force sensor utilizing vibrating accelerometers may be obtained by utilizing paired accelerometers for each axis for which angular rate information is desired. There are three arrangements of paired accelerometers described herein which can provide a significant increase in the accuracy of both the rate and force signal obtained. The first such arrangement calls for two accelerometers mounted together with their input- or force-sensing axes parallel to the axis about which they are vibrated. A second arrangement has both accelerometers mounted back to back with their force-sensing axes opposite one another and normal to an axis about which they are vibrated. The third arrangement calls for the accelerometers to be mounted back to back with their force-sensing axes opposite to one another and having the accelerometers vibrated in a linear direction normal to the force-sensing axes.

The paired arrangement described above makes it possible to further separate the force signals from the rate signals by summing and differencing the output signals of the paired accelerometers prior to having these signals input to a signal separation circuit.

Further features and advantages of the invention will be apparent from the description below.

BRIEF DESCRIPTION OF THE DRAWINGS

The invention is herein described, by way of example only, with reference to the accompanying drawings, wherein:

FIG. 7 illustrates a second form of vibrating accelerometer assembly constructed in accordance with the present invention, based on the use of an electrical torque motor rotationally driving the accelerometer and a counterbalancing mass through a small angular oscillatory motion;

FIG. 8 illustrates a third form of vibrating accelerometer assembly constructed in accordance with the present invention, based on the use of a tuning fork for precisely balancing the dynamical forces;

FIG. 9 is a block diagram illustrating an electromechanical oscillator arrangement including a tuning-fork accelerometer assembly such as illustrated in FIG. 8;

DESCRIPTION OF PREFERRED EMBODIMENTS

Figure 1:
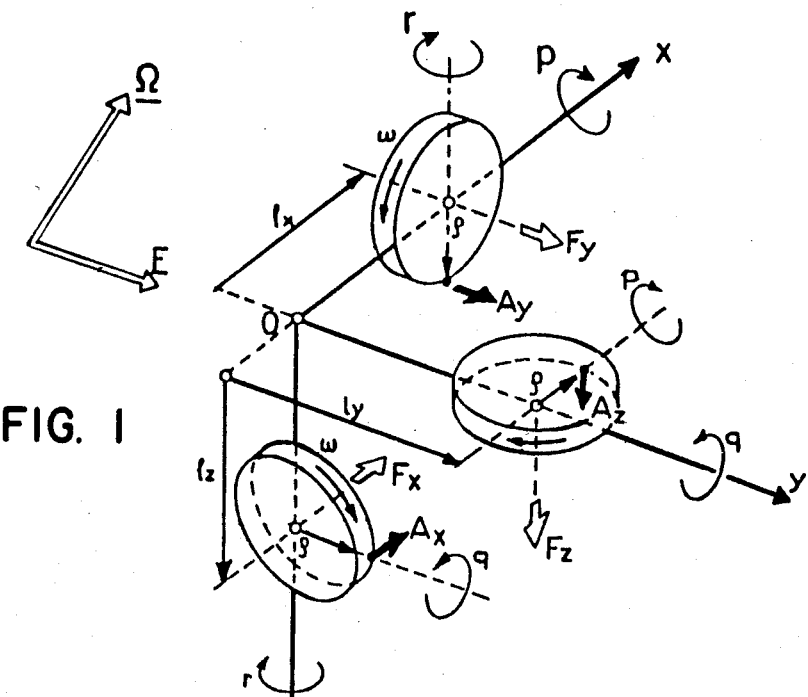
FIG. 1 is a diagram which will be helpful in explaining the principle of signal separation described in the above-cited patent application and used in the preferred embodiment of the present invention as described herein.
Figure 2:
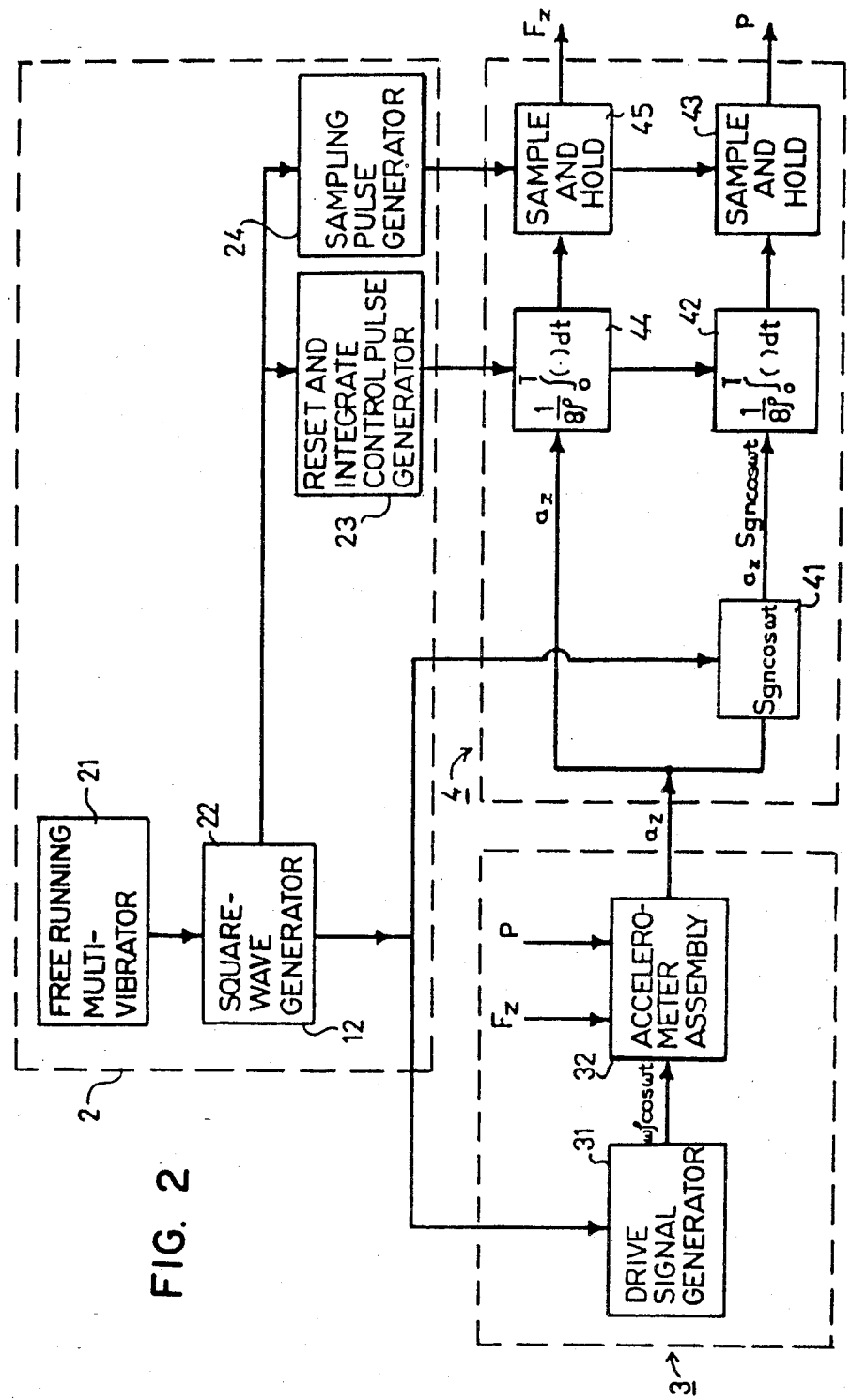
FIG. 2 is a block diagram illustrating one form of nongyroscopic Inertial Measuring System based on the principle of signal separation described in the above-cited patent application and also included in the preferred embodiment of the present invention.

Overall System and Principle of Signal Separation (FIGS. 1 and 2)

Before describing the various embodiments of the invention as illustrated in FIGS. 3–8, it is believed that a preliminary discussion of the principles of signal separation and of the overall system for measuring specific force and angular rate of a moving body, both as described in the above-cited patent application and article, will be helpful in better understanding the present invention and its advantages, particularly when the present invention is embodied in such a measuring system.

With reference to FIG. 1, the general equation for total acceleration measurable at a point mass moving in a rotating system is $$\underline{a} = \underline{F} + \Omega \times \underline{r} + 2\Omega \times \frac{dr}{dt}\bigg|_b + \Omega \times (\underline{\Omega} \times \underline{r}) + \frac{d^2 r}{dt^2}\bigg|_b \quad (1)$$

where $\Omega$ is the angular rate or velocity vector of the system, F is the specific force vector and r is the instantaneous distance of the point mass from the center of rotation of the system. In particular, $r = \rho + 1$, wherein $\rho$ is the instantaneous vector distance of the point mass from its center of revolution, and l the fixed distance of the element's center of revolution to the system center of rotation. The index b indicates differentiation with respect to the rotating body axes. Equation (1) can now be rewritten as follows:

$$\underline{a} = \underline{F} + \Omega \times (\underline{\rho} + \underline{l}) + 2\Omega \times \frac{d\rho}{dt}\bigg|_b + \Omega \times (\Omega \times (\underline{\rho} + \underline{l})) + \frac{d^2\rho}{dt^2}\bigg|_b \quad (2)$$

substituting $$\begin{bmatrix} \rho_x \\ \rho_y \\ \rho_z \end{bmatrix} = \begin{bmatrix} 0 & \rho_x \cos\omega t & \rho_x \sin\omega t \\ \rho_y \sin\omega t & 0 & \rho_y \cos\omega t \\ \rho_z \cos\omega t & \rho_z \sin\omega t & 0 \end{bmatrix} \begin{bmatrix} \underline{i} \\ \underline{j} \\ \underline{k} \end{bmatrix}$$

where i, j and k are the unit vectors in the +x, +y and +z directions, respectively, incorporating the noise components $n_x$, $n_y$, $n_z$, respectively, resolving a into $a_x$, $a_y$, and $a_z$ letting $\rho_x = \rho_y = \rho_z = \rho$ and rearranging terms, we have $$a_x = Fx + l_z(\dot{q} + pr) + \underline{2\omega\rho\cos\omega t}\left(q - \frac{\dot{r}}{2\omega}\right) + \quad (3)$$

$$2\omega\rho\sin\omega t\left(r + \frac{\dot{q}}{2\omega}\right) + \rho\rho(q\cos\omega t + r\sin\omega t) + n_x$$

$$a_y = Fy + l_x(\dot{r} + qp) + \underline{2\omega\rho\cos\omega t}\left(r - \frac{\dot{p}}{2\omega}\right) + \quad (4)$$

$$2\omega\rho\sin\omega t\left(p + \frac{\dot{r}}{2\omega}\right) + qp(r\cos\omega t + p\sin\omega t) + n_y$$

$$a_z = Fz + l_y(\dot{p} + rq) + \underline{2\omega\rho\cos\omega t}\left(p - \frac{\dot{q}}{2\omega}\right) + \quad (5)$$

$$2\omega\rho\sin\omega t\left(q + \frac{\dot{p}}{2\omega}\right) + rp(p\cos\omega t + q\sin\omega t) + n_z$$

Each of the noise signals $n = [n_x, n_y, n_z]'$ is assumed to consist of three components as follows:

$$n = n_d + n_v + n_r$$

where:
- $n_d$—Low frequency (drift) noise
- $n_v$—Periodic or random vehicular vibration noise
- $n_r$—Random zero-mean high-frequency sensor noise Thus, in the rotating accelerometer system illustrated in the above-cited patent application, in addition to the underlined desirable terms in Equations (3)–(5), there are a variety of additional undesirable terms potentially contributing to errors. These primarily result from the dynamical terms containing p, q, r and their derivatives and from the sensor noise components contained in n.

As further described in the above-cited patent application, an important feature of that invention is that it provides means for separating $F_x$ from q, $F_y$ from r, and $F_z$ from p, in such a manner that the undesirable terms are suppressed to a sufficiently low level so that the effect of the cross-product terms qp, qr and rp is substantially eliminated.

An important advantage in the use of vibrating accelerometers in accordance with the present invention is that the orthogonal terms, e.g., $2\gamma\omega\rho \sin \omega t$ "and $\rho(pq-r) \cos \omega$"; in Equation (3) above (and the corresponding terms in Equations (4) and (5) above) actually drop out, thereby even further reducing this source of error in the rotating accelerometer arrangement. That is to say, since these orthogonal terms result from the rotational movement of the accelerometers, they are not present in the invention of this patent application involving a vibrational movement of the accelerometers.

FIG. 2 of the present application (which corresponds to FIG. 4 of the above-cited patent application) illustrates in block diagram form one nongyroscopic Inertial Measuring Unit (IMU) implementing the above-described principles of signal separation with respect to one channel, namely that of accelerometer $A_z$, it being appreciated that the other two channels, for accelerators $A_x$ and $A_y$, are similarly constructed.

The unit illustrated in FIG. 2 includes three major subsystems, namely: a control pulse generator, generally designated 2; an electromechanical drive, generally designated 3, for rotating each of the accelerometers of the triad illustrated in FIG. 1; and an electronic signal-separation processor, generally designated 4.

The control pulse generator 2 is driven by a free-running, multivibrator 21 having a high precision reference frequency 4f (f=1/T). The multivibrator controls a square wave generator 22 which generates squarewaves at a frequency f. These square waves are used as synchronizing pulses. They are applied to a reset-and-integrate control pulse generator 23 and to a sampling pulse generator 24, which generators are used to control the operation of processor 4, as will be described more particularly below.

Synchronizing pulses from the square-wave generator 22 are also applied to a drive signal generator 31 within the electromechanical drive system 3. The output pulses from generator 31 drive the accelerometers of the assembly 32, such that the accelerometers are rotated about their respective axes at a predetermined frequency ($\omega$) equal to $2\pi f$. Thus, when the body to which the accelerometer assembly 4 is strapped down is subject to a specific force $F_z$ and angular roll rate p, it produces a resultant output of $a_z$.

The accelerometer output $a_z$ is fed to the processor 4 for separating therefrom the specific force vector $F_z$ and angular rate vector p in such a manner so as to substantially suppress the undesirable components of signal $a_z$ in accordance with the Equations (3)–(5) and (6)–(8) discussed above. In this case, we are considering the $F_z$ and p components, so that equation (5) is the pertinent one.

Thus, processor 4 includes a multiplier or sign-switching circuit 41 for multiplying the introduced values $a_z$ by the zero mean periodic function "sgncos $\omega t$," outputting the product signal $a_z$ sgncos $\omega t$. This latter signal is fed to an integrating circuit 42 which integrates the product signal over the cyclic period T. The integrating circuit 42 is reset at the end of period T by the control pulse generator 23, but before being reset, it outputs its contents to a sample-and-hold circuit 43, which latter circuit is controlled by the sampling pulse generator 24. As described above, this processing of the accelerometer output signal $a_z$ causes the contents of the sample-and-hold circuit 43 to correspond to the angular rate component "p".

The accelerometer output signal $a_z$ is also fed to a second channel within processor 4 including a second integrating circuit 44 which integrates that signal over the period T. Integrating circuit 44 is also reset at the end of period T by the control pulse generator 23, but just before being reset, it outputs its contents to another sample-and-hold circuit 45 controlled by the sampling pulse generator 24. It will be appreciated, from the previous discussion, that the contents of the sample-and-hold circuit 44 will correspond to the specific force vector $F_z$.

Reference may be had to the above-cited patent application for a further description of the overall system and the advantages provided by the principle of signal separation on which that system is based, it being appreciated that the same advantages would apply to the present invention when implemented in such a measuring system in addition to the further advantages attainable by the invention of the present invention, as described more particularly below.

PRINCIPLE OF USING VIBRATING ACCELEROMETERS (FIG. 3)

Figure 3:
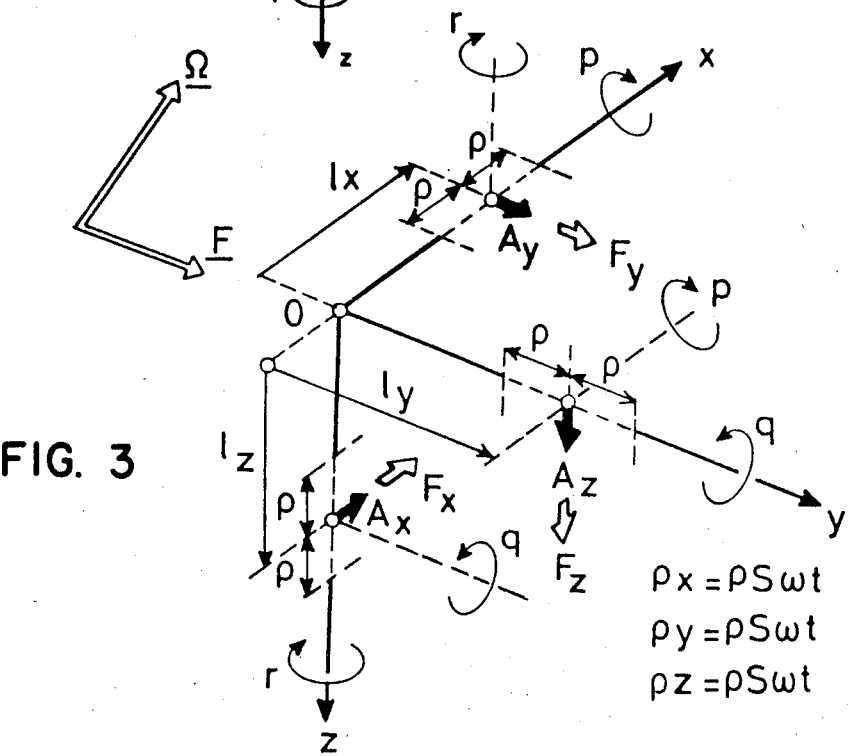
FIG. 3 is a diagram similar to that of FIG. 1 but modified so as to include vibrating accelerometers in accordance with the present invention, rather than rotating accelerometers as in FIG. 1.

Briefly, the invention of the present application utilizes vibrating accelerometers for generating the accelerometer output signals from which are derived the components of the specific force vector F and the components of the angular rate vector $\Omega$ while substantially suppressing the undesirable components of such signals. This is illustrated in FIG. 3, which is similar to the diagram of FIG. 1 but includes vibrating accelerometers rather than rotating accelerometers. FIG. 3 thus illustrates a triad of accelerometers $A_x$, $A_y$, $A_z$ arranged to vibrate at an amplitude "$\rho$" and frequency "$\omega$" perpendicular to the (x,y), (y,z) and (x,z) planes, respectively, with the sensitive input axes aligned as shown in the x, y, z directions.

Specific vibrating accelerometer mechanizations are illustrated in FIGS. 4 through 9, to be described below. These figures illustrate only one channel, namely that of accelerometer $A_z$, wherein the accelerometer-sensitive axis for the specific force vector is the Z-axis, and the axis of vibration is the Y-axis, the sensitive axis for the angular rate vector being the X-axis. Thus, accelerometer $A_z$, vibrating along the Y-axis, measures the inertial specific force and angular rate of the moving body with respect to reference axes Z and X. It will be appreciated that the other two channels, i.e., for accelerometers $A_x$ and $A_y$, are similarly constructed and provide corresponding measurements for their respective axes. Preferably, the frequency of vibration ($\omega$) of the accelerometers in all the below-described embodiments is 30–60 Hz, and the displacement during their vibratory motions is typically in the range of 0.25–3 mm.

As indicated earlier, one of the main advantages in the use of vibrating accelerometers, over rotational accelerometers, is that the orthogonal terms in Equations (3)–(5) (e.g., $2\gamma\omega\rho \sin \omega t$ "and $\rho$ (pq−r) cos $\omega t$; in Equation 3) do not even exist, thereby inherently permitting greatly improved overall performance. Many other advantages are described more particularly below.

VIBRATING-ACCELEROMETER ARRANGEMENT OF FIGS. 4 THROUGH 6

Figure 4:
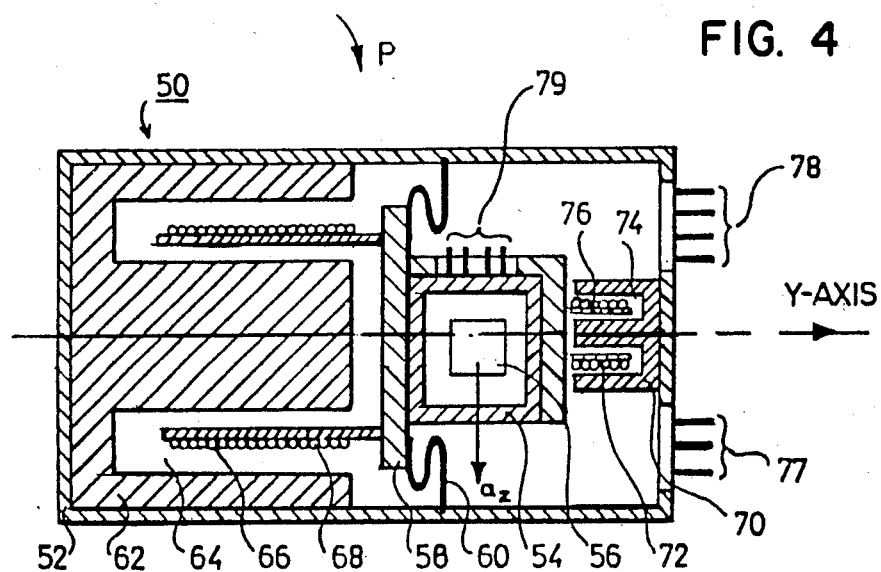
FIG. 4 illustrates one form of vibrating accelerometer assembly constructed in accordance with the present invention.

The accelerometer assembly illustrated in FIG. 4, therein generally designated 50, comprises an outer cylindrical housing 52 enclosing an accelerometer unit 54 containing an accelerometer proof mass 56. The accelerometer unit 54 is carried by a mounting plate 58 resiliently mounted within housing 52 by means of a resilient diaphragm 60, which diaphragm constrains the movement of the accelerometer unit 54 only to the Y-axis, this being the axis of vibration, and perpendicular to the Z-axis, which is the specific-force-vector-sensitive axis for the accelerometer assembly, as noted above.

The driving means for vibrating the accelerometer unit 54 along the Y-axis comprises a permanent magnet 62 of cylindrical construction fixed within housing 52 at one end thereof and formed with a cylindrical air gap 64 coaxial with the Y-axis of vibration of the accelerometer assembly. The drive means further includes a driving coil 66 carried on a cylindrical bobbin 68 fixed to the accelerometer mounting plate 58 within the cylindrical air gap 64 and coaxial with the Y-axis of vibration. Driving coil 66 is adapted to receive sinusoidal driving current producing a force which causes the accelerometer unit 54, including its proof mass 56 and mounting plate 58, to move sinusoidally along the Y-axis of vibration as constrained by the spring force of diaphragm 60.

The accelerometer assembly illustrated in FIG. 4 further includes pick-off means disposed within housing 52 and coupled to the accelerometer unit 54 and its mass 56 for measuring the rate of displacement thereof along the Y-axis of vibration. Such pick-off means may comprise another permanent magnet 70 (or an ironless field coil) and a pick-off coil 72 cooperable therewith at the other end of housing 52. Permanent magnet 70 is also of cylindrical construction, but of much smaller dimensions than the drive magnet 62, and is also formed with a cylindrical air gap 74, and the pick-off coil 72 is also carried on a cylindrical bobbin 76 secured to the accelerometer unit 54 so that the pick-off coil 72 is disposed within air gap 74 and is coaxial to the Y-axis of vibration of the accelerometer assembly.

The accelerometer assembly illustrated in FIG. 4 further includes a first group of external terminals 77 connected by electrical leads (not shown) to the driving coil 66 for feeding in the driving current and the pick-off coil 76 measuring the motion of the accelerometer 54, and a second group of external terminals 78 connected by electrical leads (not shown) to internal terminals 79 carried by the accelerometer unit 54 for feeding the supply voltages and output signals to and from the accelerometer unit 54.

It will thus be seen that the sinusoidal driving current ($I = I_m \sin \Omega t$) fed into the driving coil 66 exerts a force proportional to it and causes the accelerometer unit 54, including its mass 56 and mounting plate 58, to vibrate sinusoidally along the Y-axis as constrained by the resilient diaphragm 60 in a manner similar to the excitation of a loudspeaker. The pick-off coil 72, which moves with the accelerometer unit 54, induces a voltage proportional to the velocity of the sinusoidal motion of the accelerometer unit 64, the measured velocity of motion along the Y-axis of vibration (namely $\dot{y}$) being outputted via terminal 77. Thus, if the motion due to $I = I_m \sin \omega t$ is $y = y_m \sin(\omega t + \phi) = \rho \sin(\omega t + \phi)$, wherein $\phi$ is a phase shift due to the dynamic lag of the moving assembly, the corresponding velocity is $\dot{y} = \rho \omega \cos(\omega t + \phi)$. The signal outputted by the pick-off coil 72 constitutes this measured velocity ($\dot{y}$) of the moving assembly, including the accelerometer unit 54.

Figure 5:
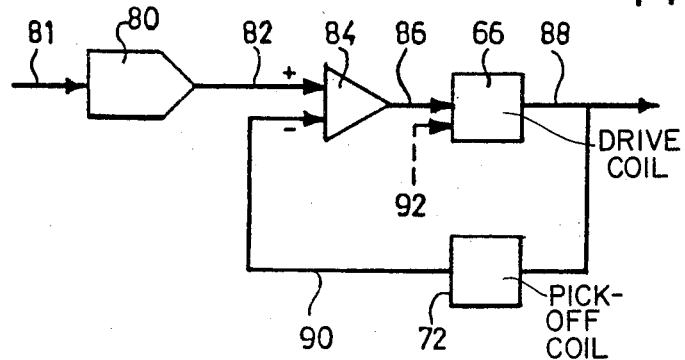
FIG. 5 is a diagram of a closed-loop accelerometer assembly drive constructed in accordance with the present invention.
Figure 6:
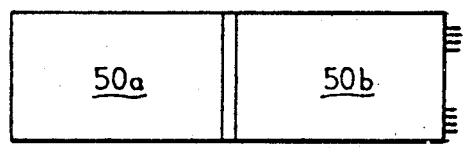
FIG. 6 schematically illustrates the use of two vibrating accelerometer assemblies, each in accordance with the construction illustrated in FIG. 4, for example, mounted in back-to-back relationship for balancing the dynamical forces.

FIG. 5 illustrates how this measured velocity ($\dot{y}$), outputted by the pick-off coil 72, is also used to enforce a closed-loop controlled motion of the accelerometer unit 54, by controlling the supply of the driving current to the driving coil 66.

Thus, the control signal generator 80, synchronized by input pulses 81, generates the signal $V = V_m \cos \omega t$, which is fed via lead 82 to a differential power amplifier 84. The output of amplifier 84 is connected by lead 86 to the drive coil 66 of the accelerometer assembly illustrated in FIG. 4, thereby driving the assembly by means of a current $I = I_m \sin(\omega t + \phi)$. The latter current produces the force $F = F_m \sin(\omega t + \phi)$, which causes the motion (indicated by output arrow 88) $\dot{y} = \rho \omega \cos(\omega t + \phi)$. The latter motion is measured by the pick-off coil 72 in FIG. 4 and is fed, via lead 90, into another input terminal of the differential power amplifier 84. The small difference between the signal on lead 90 and the signal $V = V_m \cos \omega t$ is amplified to create the drive signal $I = I_m \sin(\omega t + \phi)$.

The arrangement of FIG. 5 is a negative feedback loop having a total loop gain L determined by the gain of amplifier 84 and the pick-off 72. To those familiar with the art it is clear that by providing $L \gg 1$, it is assured that y will closely follow $V = V_m \cos \omega t$, and that a possible force disturbance $F_d$, shown schematically via the dotted line 92, will excite a disturbance in the velocity y given by $\dot{y}_d \simeq F_d / L$. Since $L \gg 1$, $\dot{y}_d$ can be suppressed to a negligibly low level, thus forcing the accelerometer unit 54 and mass 56 in FIG. 4 to perform for all practical purposes as a rigid body with respect to disturbing forces along the Y-axis.

It is thus seen that the closed-loop drive system of FIG. 5 provides a well regulated and controlled sinusoidal linear velocity along the Y-axis. The amplifier 84 is so designed in terms of the frequency response that the closed-loop transfer function of FIG. 5, denoted by $H(\omega) \triangleq \dot{y}(\omega)/V_i(\omega)$, is flat up to a bandwidth "b", such that $b \gg \omega$, and the phase shift $\phi = \angle H(\omega)$ at the driving frequency $\omega$, is practically zero. The high-gain, feedback drive system generating the required motion with a negligible nonlinear and phase distortion.

Two aspects of major importance will now be demonstrated:
(1) large bandwidth and small phase distortion of the closed-loop system; and
(2) immunity to nonlinear distortion due to the velocity pick-off coil 72.
(1) With respect to aspect (1) above, the open-loop transfer function of the electrodynamic drive is given by:

$$F = BlJ \simeq Blu/R_c$$

wherein:
B = magnetic induction;
l = length of driving coil;
$R_c$ = resistance of driving coil;
$J \simeq u/R_c$; and
u = input voltage at coil terminals.
Now, if:
m = mass of moving assembly;
b = damping coefficient; and
c = spring constant of diaphragm
then:

$$F = m\ddot{y} + b\dot{y} + cy \Longrightarrow m\left(s^2 + \frac{b}{m}s + \frac{c}{m}\right)y;$$

$$\frac{Bl}{mR_c} u = (s^2 + 2\omega_n \zeta s + \omega_n^2)y$$

$$K \triangleq \frac{Bl}{mR_c} \; ; \; \omega_n \triangleq \sqrt{\frac{c}{m}} \; ; \; \zeta \triangleq \frac{1}{2}\frac{b}{\sqrt{mc}}$$

$$\dot{y} = \frac{Ks}{s^2 + 2\omega_n \zeta s + \omega_n^2} u$$

Denoting the input driving voltage by $V_i$ (output of the drive signal generator 80 in FIG. 5), we can express the closed-loop transfer function as:

$$\frac{\dot{y}}{u} = \frac{\frac{AKs}{s^2 + 2\omega_n \zeta s + \omega_n^2}}{1 + \frac{AKs}{s^2 + 2\omega_n \zeta s + \omega_n^2} H} =$$

-continued $$\frac{AKs}{s^2 + (2\omega_n\zeta + AKH)s + \omega_n^2}$$

where H is the scale factor of the velocity pick-off 72 in FIG. 5.

It is easily verified that K can be quite large. By its definition, and using electromagnetic units $$K = \frac{Bl}{10mR_c} \simeq \frac{Bl}{WR_c} = \frac{B}{W\rho} S$$

where
W=weight of moving mass;
$\rho$=resistivity of copper coil; and
S=coil wire cross section;
thus, for B=$10^4$ Gauss; W=100 gr; S=$10^{-4}$cm$^2$; $\rho$(for copper)=$1.6 \times 10^{-6}$:

$$K = \frac{10^4 \times 10^{-4}}{100 \times 1.6 \times 10^{-6}} = \frac{10^4}{1.6} = 6000$$

Assuming, e.g., A≃100, clearly AKH is in the order of $10^5 \div 10^6$. Thus, AKH>>$2\omega_n\zeta$, and the relation $\dot{y}$≃1/H $V_i$ holds over a very wide bandwidth so that phase distortion $\phi$ can be made negligibly small for the excitation frequency of 30–60 Hz.

(2) With respect to aspect (2) above, since $\dot{y}$≃1/H $V_i$ we can write $\dot{y}$=h$V_i$ where h$\triangleq$1/H. Let a possible nonlinearity be expressed as follows:

$$y = h_0 V_i + h_1 V_i^2$$

For $V_i = V_{im} \cos \omega t$ we have:

$$\dot{y} = h_0 V_{im}\cos\omega t + h_1 V_{im}^2 \cos^2\omega t =$$

$$h_0 V_{im}\cos\omega t + \frac{h_1 V_{im}^2}{2} + \frac{h_1 V_{im}^2}{2} \cos 2\omega t$$

The operation of sgncos $\omega t$ of the signal separation processor, and the integration over the cyclic period T, clearly causes the contributions due to $$\frac{h_1 V_{im}^2}{2} \text{ and } \frac{h_1 V_{im}^2 \cos^2\omega t}{2}$$

to drop. Thus, the velocity pick-up sensor 72 is not critical in requirements of linearity.

It will be appreciated that when the invention is applied to a strapdown-type of inertial guidance system, an accelerometer assembly 50, as illustrated in FIG. 4, including a closed-loop drive as illustrated in FIG. 5, would be applied for each of the three axes, with the outer housing 52 of the accelerometer assembly mounted to the vehicle (i.e., the moving body). In a stable gimballed platform-type of inertial guidance system, the outer housing 52 of the accelerometer assembly 50 for each axis would be applied to the inner gimbal of the platform.

In either application, the vibratory motion of the accelerometer assembly may cause reaction forces acting on the support of the outer housing 52. In order to avoid these undesired unbalancing forces, two vibrating assemblies, such as shown at 50a and 50b in FIG. 6, may be mounted back to back, with one assembly including an accelerometer, as described above, vibrating in synchronism with, but in opposite direction to, the other assembly vibrating a counterbalancing mass dynamically balancing the accelerometer assembly.

OSCILLATING ACCELEROMETER ARRANGEMENT OF FIG. 7

FIG. 7 illustrates a second type of vibrating accelerometer arrangement, namely, one in which the accelerometer is rotated by an electrical torque motor through a small angular oscillatory motion (e.g., a few degrees) which makes the vibratory motion almost rectilinear. The sensitive axis of the accelerometer is parallel to this axis of rotation. A suitable balancing mass is provided to dynamically balance the accelerometer during its oscillatory motion so that no external forces are imparted to the body to which the assembly is mounted.

Thus, the accelerometer assembly illustrated in FIG. 7, therein generally designated 100, comprises an outer cylindrical housing 102 rotatably mounting a shaft 104 via rotary bearings 106 and 108. To shaft 104 is secured a disc or plate 110, which serves as a supporting member for supporting an accelerometer unit 112 having a proof mass 114. Disc 110 also carries a counterbalancing mass 116 on the opposite side of the disc.

Disc 110 is driven through a small angular oscillatory motion by means of an electrical torque motor including a stator 118 fixed to housing 102 and a rotor 120 fixed to shaft 104. A pick-off rotor 122 is secured to the opposite end of shaft 104 and is disposed within a pick-off stator 124 secured to housing 102.

The electrical connections may be the same as illustrated in FIG. 5, wherein the differential power amplifier 84 feeds the driving current to the conductors of the torque motor stator 118 to drive its rotor 120 and, thereby, the accelerometer 112 and counterbalancing mass 116 secured to the motor rotor 120, through a small angular oscillatory motion having an amplitude ″ ″. This will cause the displacement $\dot{y}$≃r$\dot{\psi}$, where "r" is the radius from the axis of rotation 130 of shaft 104 to the center of gravity of the accelerometer proof mass 114. Thus, if $\psi = \psi_m \sin \omega t$, then $\dot{y} = r\omega\psi_m \cos \omega t$, pointing into the paper plane. It will be appreciated that the oscillatory movement of the accelerator 112 into and out of the paper plane is substantially linear along an axis perpendicular to the sensitive Z-axis of the accelerometer.

As one example, "r" may be about 3 cm; the angular oscillatory motion may be a few degrees; and the amplitude of displacement of the accelerometer may be 0.25–3 mm.

The pick-off 122 fixed to shaft 104 senses the angular velocity $\dot{\psi} = \omega\psi_m \cos \omega t$. As in the case of the pick-off 72 in FIG. 5, the output of the pick-off 122 in FIG. 7 may be connected as a feedback into differential amplifier 84, to which the driving voltage $V_i = V_m \cos \omega t$ is fed via lead 82. Thus, the angular velocity $\dot{\psi}$ in the FIG. 7 arrangement is made to follow closely the driving voltage $V_i = V_m \cos \omega t$.

This arrangement illustrated in FIG. 7 has a number of advantages over that described above with respect to the FIGS. 4–6, including greater simplicity of mechanical parts, high precision of motion implementation, and substantially complete immunity to linear accelerations in all axes.

TUNING-FORK ARRANGEMENT OF FIGS. 8 AND 9

FIG. 8 illustrates a third type of vibrating accelerometer assembly, namely, one using a tuning fork, which may be provided for each sensitive axis of the moving body in order to provide dynamic balancing of the forces, as well as important advantages to be described below. FIG. 9 illustrates a manner of connecting the vibrating accelerometer assembly of FIG. 8 so as to form an electromechanical oscillator for sustaining oscillations of the tuning-fork accelerometer assembly with but a small amount of input power, sufficient to replenish the energy loss due to friction.

With reference first to FIG. 8, the vibrating accelerometer assembly, therein generally designated 200, comprises an outer cylindrical housing 202 in which is mounted a tuning fork 204, including a pair of prongs 204a, 204b. The prongs extend parallel to the sensitive axis for the respective accelerometer assembly, this being the Z-axis in FIG. 8, and thereby perpendicularly to the axis of vibration of the accelerometer assembly, this being the Y-axis in FIG. 8. The tuning fork 204 is mounted within housing 202 by means of a mounting post 206 secured to an intermediate web 204c of the tuning fork.

Housing 202 further includes another post 208 aligned with post 206 but spaced from it and also from web 204c of the tuning fork 204. Post 208 is used for mounting, on one side, a permanent magnet 210 cooperable with a drive coil 212, and, on the other side, a permanent magnet 214 cooperable with a pick-off coil 216. The two permanent magnets 210 and 214 are of cylindrical configuration and include cylindrical air gaps within which are disposed their respective drive coil 212 and pick-off coil 216, each of the latter coils being carried on cylindrical bobbins 218 and 220 secured to the inner faces of the two prongs 204b and 204a.

To the outer face of prong 204b of the tuning fork is secured, by means of a mounting 222, an accelerometer unit 224 having a mass 226. In a similar manner, there is secured to the outer face of prong 204a of the tuning fork another mass 228 to provide a counterbalance for accelerometer unit 224 and its mass 226.

The electrical connections to the driving coil 212 and pick-off coil 216, as well as to the accelerometer unit 224, are provided by terminals 230 and 232 extending externally of housing 202 and terminals 234 internally of the housing and connected to the accelerometer unit 224.

It will be appreciated that the tuning fork 204 in FIG. 8 vibrates at this natural frequency, and thereby causes the accelerometer unit 224 and its mass 226 on prong 204b to move in synchronism with, but in opposite directions to, the counterbalancing mass 228 on prong 204a. Thus, no net force is exerted on the housing 202, and therefore, on any support to which the vibrating accelerometer assembly 200 is secured. As described above with respect to FIGS. 4–6, this support would be the moving body itself in a strapdown application, and the inner gimbal of a platform in a stable gimballed platform application. The arrangement illustrated in FIG. 8 thus provides a high degree of dynamic balancing.

Because of friction and damping, the oscillations of the tuning fork 204 would decay to "0" in a relatively short period of time. To sustain the oscillations indefinitely, the vibrating accelerometer assembly 200 illustrated in FIG. 8 may be connected to form an electromechanical oscillator, as illustrated in FIG. 9.

Thus, as shown in FIG. 9, the signal across the pick-off coil 216 is fed to an amplifier 240, the output of which is connected to the input of the driving coil 212. The amplifier 240 is of a polarity to reinforce any initial displacement of the prongs 204a, 204b of the tuning fork 204. Thus, the system operates as an electromechanical oscillator having a frequency determined by the natural frequency of the tuning fork. This natural frequency can be used to synchronize precisely the frequency of the free-running multivibrator 21 in FIG. 2.

Preferably, amplifier 240 is of the nonlinear type, such as including a saturation device, so as to force the complete electromechanical oscillator to stabilize at a finite amplitude.

It will thus be seen that the tuning-fork accelerometer assembly arrangement illustrated in FIGS. 8 and 9 provides a balancing dynamical system because of the countermoving masses, and requires but a small amount of power for the driving coil 212, merely to replenish the energy loss due to friction. The assembly, being a sharply tuned oscillator, rejects mechanical disturbances in the axis of vibration (Y-axis in FIG. 8) unless they are exactly at the resonant frequency. Further, the structure is inherently rigid in the accelerometer-sensitive axis, namely the Z-axis. Moreover, since the assembly operates at the natural frequency and synchronizes the multivibrator 21 of the control pulse generator 2 in FIG. 2, there are no phase lags involved between $\cos \omega t$ and $\mathrm{sgn}\cos \omega t$. Still further, the accelerometer assembly is extremely simple and can be constructed at low cost.

The advantages, attainable by the use of vibrating accelerometers, as described above, enable the construction of IMU's theoretically having a much higher mean-time-between-failure (MTBF) than either the gyroscope-type or of the rotational accelerometer-type IMU's.

While the invention has been described with respect to several preferred embodiments, it will be appreciated that these are set forth purely for purposes of example. Thus, there are many other possible arrangements for producing the vibrational motion, e.g., by the use of mechanical devices, such as cams or linkage, for transforming rotary motion, such as from an electrical (preferably synchronous) motor, to the vibrational motion. Many other variations, modifications and applications of the invention will be apparent.

PAIRED ACCELEROMETER ARRANGEMENTS

Figure 10:
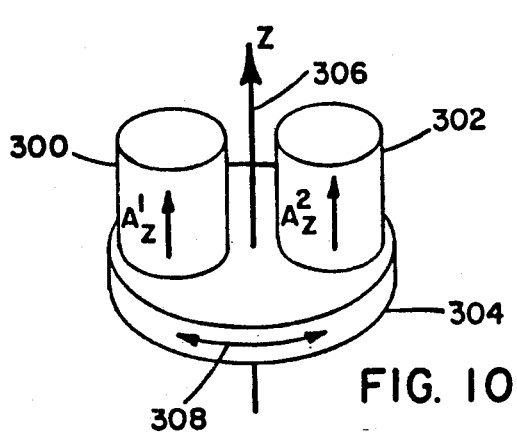
FIG. 10 is a simplified, perspective diagram of paired accelerometers having their force-sensing axes parallel to an axis of angular vibration.
Figure 11:
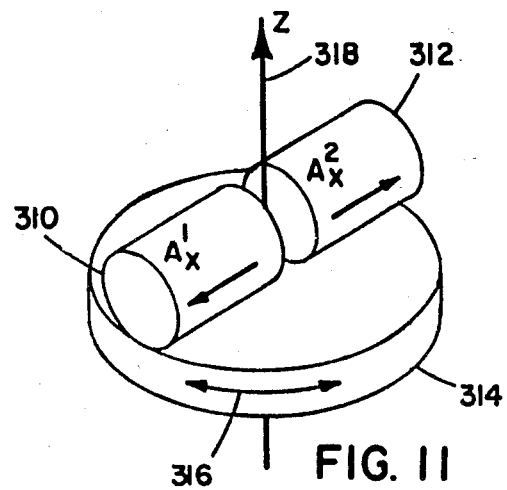
FIG. 11 is a simplified, perspective diagram of paired accelerometers arranged back to back with their force-sensing axes normal to an axis of angular vibration.
Figure 12:
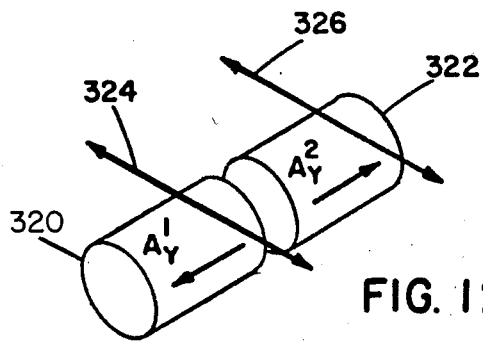
FIG. 12 is a simplified, perspective diagram of paired accelerometers arranged back to back with their force-sensing axes normal to the direction of linear vibration.

Significant improvements in signal strength for both the force and the rate channel can be achieved at the same time a reduction in signal noise can be obtained when pairs of accelerometers, instead of a single accelerometer as shown in FIG. 3, are used for each axis of rotation. Simplified illustrations of three arrangements of paired accelerometers are provided in FIGS. 10–12. A significant advantage of utilizing accelerometers arranged in pairs, as shown in FIGS. 10–12, is that the noise present in both the force and the rate channel of FIG. 2 is increased only by the square root of two while the effective force and rate signals are doubled, thus providing an effective signal to noise increase of a square root of two. In addition, common acceleration disturbances in the rate channel due to external forces that may result from vehicular and mechanization sources are substantially cancelled in this type of arrangement.

The first arrangement of paired accelerometers is illustrated in FIG. 10 where a pair of accelerometers 300 and 302 are mounted on an angularly rotating base 304 which vibrates about the Z-axis 306 as indicated by the arrows 308. The force-sensing axes $A_z^1$ and $A_z^2$ of the accelerometers 300 and 302 are aligned so as to be parallel to the Z-axis 306 about which the support 304 vibrates. Since the arrangement in FIG. 10 includes a pair of accelerometers with their force-sensing axes $A_z^1$ and $A_z^2$ parallel to the vibration axis 306, this arrangement will hereinafter be referred to as the PAPVA arrangement.

The second arrangement of paired accelerometers is shown in FIG. 11 where two accelerometers 310 and 312 are mounted on a support 314 which vibrates angularly about the Z-axis indicated at 318 as suggested by the arrows 316. In this arrangement, the accelerometers 310 and 312 are secured to the support 314 in a back-to-back arrangement such that the force-sensing axes $A_x^1$ and $A_x^2$ are parallel, but opposite in direction, and are normal to the axis 318 of angular vibration. This arrangement will hereinafter be termed the PANVA arrangement to denote a pair of accelerometers subject to angular motion with their force-sensing axis normal to the axis of vibration or angular motion.

The third arrangement is illustrated in FIG. 12 where a pair of accelerometers 320 and 322 are arranged back to back with their force-sensing axes $A_y^1$ and $A_y^2$ located in parallel but opposite directions. In this arrangement, the accelerometers 320 and 322 are caused to vibrate in a linear direction along the X-axis, as indicated by arrows 324 and 326. For convenience, this arrangement will hereinafter be referred to as PLNVA due to the fact that it is an arrangement of paired accelerometers caused to vibrate in a linear manner along a vibration axis which is normal to the force-sensing axis.

Figure 13:
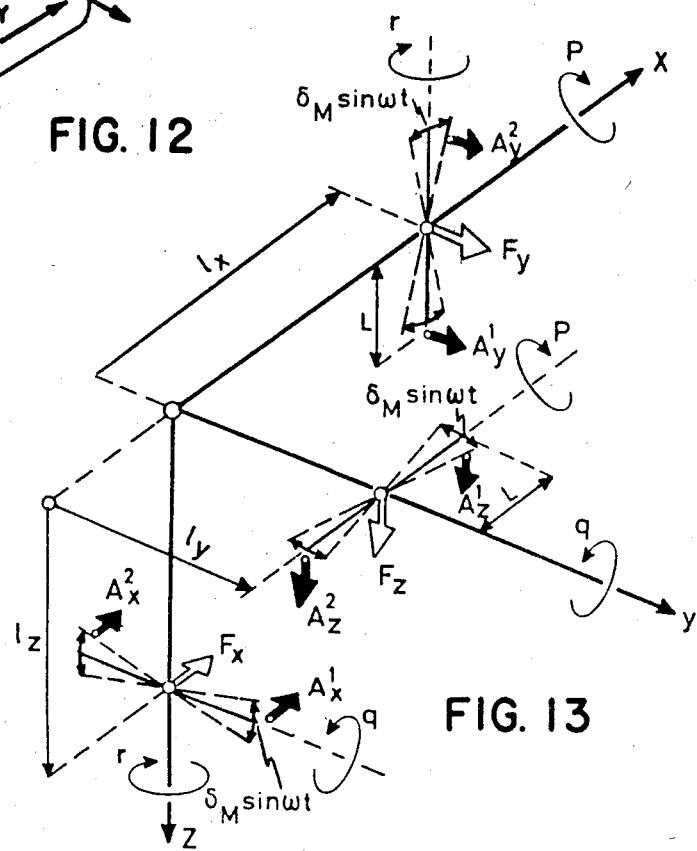
FIG. 13 is a diagram similar to that of FIG. 3 used to illustrate the operation of the paired accelerometer arrangement of FIG. 10 in a three-axis-rate sensor.
Figure 14:
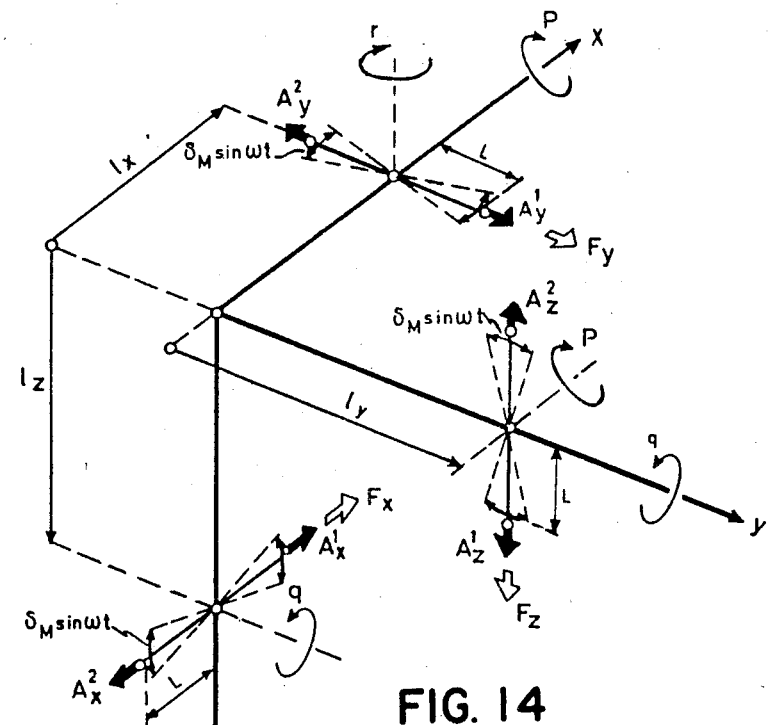
FIG. 14 is a diagram of a type similar to that of FIG. 3 illustrating the operation of the paired accelerometer of FIG. 11 in a three-axis-rate sensor.
Figure 15:
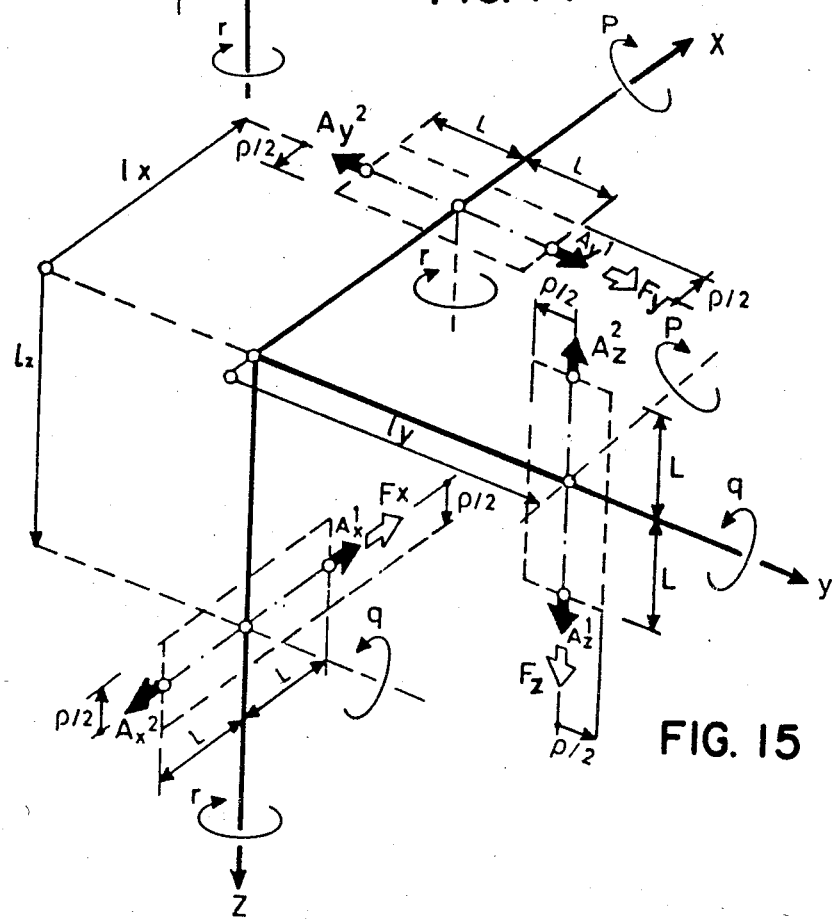
FIG. 15 is a diagram of the type similar to that of FIG. 3 illustrating the operation of the paired accelerometer arrangement of FIG. 12 in a three-axis-rate and force sensor.

FIGS. 13–15 correspond to the PAPVA, PANVA and PLNVA arrangements of FIGS. 10–12, respectively, and provide a conceptual illustration of how the paired accelerometers can be arranged in triads. In FIGS. 13–15, the accelerometers are denoted by their force-sensing axes $A_x^1$, $A_x^2$, $A_y^1$, $A_y^2$, $A_z^1$, and $A_z^2$ and prove force sensing and angular rate sensing along and about the orthogonal axes X, Y and Z. The arrangements shown in FIGS. 13–15 are suitable for use in an inertial reference system that can in turn be used in an Inertial Navigation System.

In the PAPVA mechanism shown in FIGS. 10 and 13, six accelerometers are required, namely, $A_x^1$, $A_x^2$, $A_y^1$, $A_y^2$, $A_z^1$ and $A_z^2$. The accelerometer pairs are vibrated at an angular constant frequency $\omega$ and constant angular amplitudes $\delta_M$. The principle of force and angular rate signal separation is substantially the same as illustrated in FIG. 2. The accelerometer outputs contain the same basic information for angular rotation $\Omega$ and force F, although the actual signal content is somewhat different.

In developing equations describing the signal content of the accelerometers in FIG. 13, the instantaneous distance of each accelerometer from the vehicular center of rotation is given by:

$$\begin{pmatrix} rA_x^1 \\ rA_x^2 \\ rA_y^1 \\ rA_y^2 \\ rA_z^1 \\ rA_z^2 \end{pmatrix} = \begin{pmatrix} 0 & L\cos\delta & l_z + L\sin\delta \\ 0 & -L\cos\delta & l_z - L\sin\delta \\ l_x + L\sin\delta & 0 & L\cos\delta \\ l_x - L\sin\delta & 0 & -L\cos\delta \\ L\cos\delta & l_y + L\sin\delta & 0 \\ -L\cos\delta & l_y - L\sin\delta & 0 \end{pmatrix} \begin{pmatrix} i \\ j \\ k \end{pmatrix} \quad (6)$$

and defining:

$$\delta = \delta_M S\omega t \quad (7)$$

$$\dot{\delta} = \omega \delta_M C\omega t \quad (8)$$

while assuming $\delta \ll 1$ $$\sin\delta \approx \delta = \delta_M S\omega t \quad (9)$$

$$\cos\delta \approx 1 - \tfrac{1}{2}\delta_M^2 S^2\omega t \quad (10)$$

and defining:
$L\delta_M \triangleq \rho/2$

Then substituting Equations (6)–(10) into Equation (1) and expanding, the following accelerometer output equations result:

$$a_x^1 = F_x + l_z(pr + \dot{q}) + \frac{\rho}{2}S\omega t(pr + \dot{q}) + \quad (11)$$

$$L(qp - \dot{r}) + 2\omega\frac{\rho}{2}C\omega t(q + \delta_M S\omega t \cdot r) -$$

$$(\tfrac{1}{2})L\delta_M^2 S^2\omega t(qp - \dot{r}) - 2\omega\frac{\rho}{2}C\omega t(\tfrac{1}{2})\delta_M^2 S^2\omega t \cdot q$$

$$a_x^2 = F_x + l_z(pr + \dot{q}) - \frac{\rho}{2}S\omega t(pr + \dot{q}) - \quad (12)$$

$$L(qp - \dot{r}) - 2\omega\frac{\rho}{2}C\omega t(q + \delta_M S\omega t \cdot r) +$$

$$(\tfrac{1}{2})L\delta_M^2 S^2\omega t(qp - \dot{r}) + 2\omega\frac{\rho}{2}C\omega t(\tfrac{1}{2})\delta_M^2 S^2\omega t \cdot q$$

$$a_y^1 = F_y + l_x(pq + \dot{r}) + \frac{\rho}{2}S\omega t(pq + \dot{r}) + \quad (13)$$

$$L(qr - \dot{p}) + 2\omega\frac{\rho}{2}C\omega t(r + \delta_M S\omega t \cdot p) -$$

$$(\tfrac{1}{2})L\delta_M^2 S^2\omega t(qr - \dot{p}) - 2\omega\frac{\rho}{2}C\omega t(\tfrac{1}{2})\delta_M^2 S^2\omega t \cdot r$$

$$a_y^2 = F_y + l_x(pq + \dot{r}) - \frac{\rho}{2}S\omega t(pq + \dot{r}) - \quad (14)$$

$$L(qr - \dot{p}) - 2\omega\frac{\rho}{2}C\omega t(r + \delta_M S\omega t \cdot p) +$$

$$(\tfrac{1}{2})L\delta_M^2 S^2\omega t(qr - \dot{p}) + 2\omega\frac{\rho}{2}C\omega t(\tfrac{1}{2})\delta_M^2 S^2\omega t \cdot r$$

$$a_z^1 = F_z + l_y(qr + \dot{p}) + \frac{\rho}{2}S\omega t(qr + \dot{p}) + \quad (15)$$

$$L(pr - \dot{q}) + 2\omega\frac{\rho}{2}C\omega t(p + \delta_M S\omega t \cdot q) -$$

$$-L(\tfrac{1}{2})\delta_M^2 S^2\omega t(pr - \dot{q}) - 2\omega\frac{\rho}{2}C\omega t(\tfrac{1}{2})\delta_M^2 S^2\omega t \cdot p$$

$$a_z^2 = F_z + l_y(qr + \dot{p}) - \frac{\rho}{2}S\omega t(qr + \dot{p}) - \quad (16)$$

$$L(pr - \dot{q}) - 2\omega \frac{p}{2} C\omega t(p + \delta_M S\omega t \cdot q) +$$

$$+L(\tfrac{1}{2})\delta_M{}^2 S^2 \omega t(pr - \dot{q}) + 2\omega \frac{p}{2} C\omega t(\tfrac{1}{2})\delta_M{}^2 S^2 \omega t \cdot p$$

Figure 19:
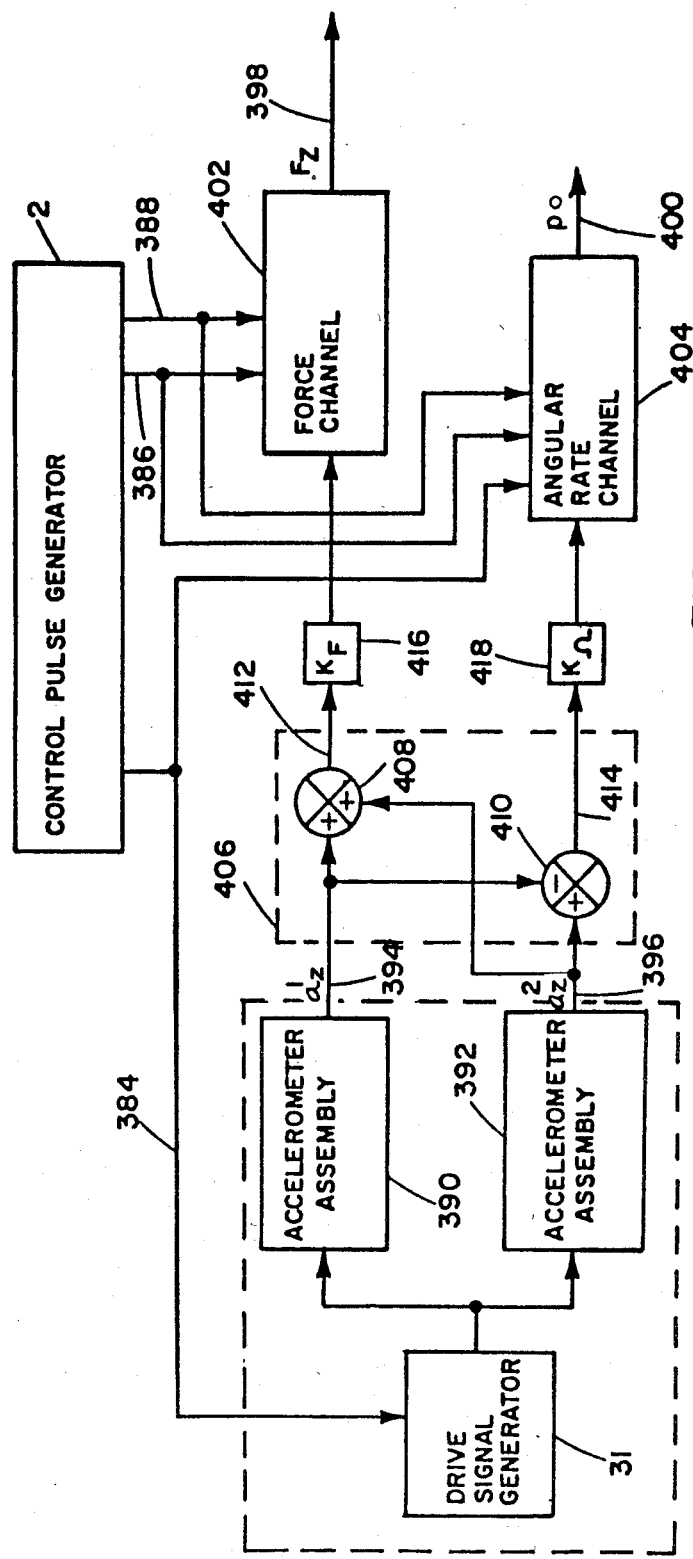

Before entering the signal processor of FIG. 19, the accelerometer signals are preprocessed as sums and differences as shown in FIG. 19 in accordance with the following matrix equation:

$$\begin{pmatrix} a_x{}^q \\ a_y{}^r \\ a_z{}^p \\ a_x{}^{Fx} \\ a_y{}^{Fy} \\ a_z{}^{Fz} \end{pmatrix} = \begin{pmatrix} 1 & -1 & 0 & 0 & 0 & 0 \\ 0 & 0 & 1 & -1 & 0 & 0 \\ 0 & 0 & 0 & 0 & 1 & -1 \\ \tfrac{1}{2} & \tfrac{1}{2} & 0 & 0 & 0 & 0 \\ 0 & 0 & \tfrac{1}{2} & \tfrac{1}{2} & 0 & 0 \\ 0 & 0 & 0 & 0 & \tfrac{1}{2} & \tfrac{1}{2} \end{pmatrix} \begin{pmatrix} a_x{}^1 \\ a_x{}^2 \\ a_y{}^1 \\ a_y{}^2 \\ a_z{}^1 \\ a_z{}^2 \end{pmatrix} \quad (17)$$

Assuming again F and $\Omega$ are substantially constant in the interval T, all time derivatives vanish in Equations (11)–(16). Substituting accordingly into Equation (17) and expanding:

$$a_x{}^q = 2\omega p C\omega t(q + \delta_M S\omega t \cdot r) + \rho S\omega t \cdot pr + 2Lqp - -L\delta_M{}^2 S^2 \omega t qp - 2\omega p C\omega t(\tfrac{1}{2})\delta_M{}^2 S^2 \omega t \cdot q \quad (18)$$

$$a_y{}^r = 2\omega p C\omega t(r + \delta_M S\omega t \cdot p) + \rho S\omega t pq + 2Lrq - -L\delta_M{}^2 S^2 \omega t rq - 2\omega p C\omega t(\tfrac{1}{2})\delta_M{}^2 S^2 \omega t \cdot r \quad (19)$$

$$a_z{}^p = 2\omega p C\omega t(p + \delta_M S\omega t \cdot q) + \rho S\omega t qr + 2Lpr - -L\delta_M{}^2 S^2 \omega t pr - 2\omega p C\omega t(\tfrac{1}{2})\delta_M{}^2 S^2 \omega t \cdot p \quad (20)$$

$$a_x{}^{Fx} = F_x + l_z pr \quad (21)$$
$$a_y{}^{Fy} = F_y + l_x qp$$
$$a_z{}^{Fz} = F_z + l_y qr$$

Thus, two advantages are obtained through the paired mechanization, all specific force components are removed from the acceleration signals in Equations (18)–(20) and all angular rate components are removed from signals in Equation (21). This significantly improves the decoupling of F from $\Omega$. Common mode noise terms due to vehicle noise are also removed from the $\Omega$ channel as can be seen from Equations (18)–(20). To obtain estimates of p, q and r as defined by Equation (22) below, $$\hat{p} = \frac{1}{8\rho} \int_0^T a_z Sgn(C\omega t) dt \quad (22)$$

$$\hat{q} = \frac{1}{8\rho} \int_0^T a_x Sgn(C\omega t) dt$$

$$\hat{r} = \frac{1}{8\rho} \int_0^T a_y Sgn(C\omega t) dt$$

p, q and r in Equations (18)–(20) are substituted into Equation (22), and to obtain an estimate of $F_x$, $F_y$ and $F_z$ as defined by Equation (23) below, $$\hat{F}_x = \frac{1}{T} \int_0^T a_x dt \quad (23)$$

$$\hat{F}_y = \frac{1}{T} \int_0^T a_y dt$$

$$\hat{F}_z = \frac{1}{T} \int_0^T a_z dt$$

$F_x$, $F_y$ and $F_z$ are substituted in Equation (21) into Equation (23). The corresponding results are:

$$\hat{p} = p(1 - 1/6\, \delta_M{}^2) \quad (24)$$
$$\hat{q} = q(1 - 1/6\, \delta_M{}^2)$$
$$\hat{r} = r(1 - 1/6\, \delta_M{}^2)$$

and:
$$\hat{F}_x = F_x + l_z pr \quad (25)$$
$$\hat{F}_y = F_y + l_x pq$$
$$\hat{F}_z = F_z + l_y qr$$

Thus, $\hat{p}$, $\hat{q}$ and $\hat{r}$ are determined precisely except for a contant known scale factor and $\hat{F}_x$, $F_y$ and $\hat{F}_z$ are the same as determined before.

It can be seen from the equations above that the outputs obtained are in many respects equivalent to the mechanization using a single accelerometer. Also, the effect of vehicular noise in the $\Omega$ channel is almost cancelled by virtue of the common mode rejection obtained through the accelerometer pairing as indicated by Equation (24). However, gradients in vehicular noise along L still retain some noise in the $\Omega$ channel. Thus, since L will normally be a few centimeters, vehicular noise is not entirely cancelled. Through possible residual angular vibration of the drive axis, residual, synchronous and uncontrolled noise may be retained and appear as an unknown bias in the $\Omega$ channel. Also, the mechanization in FIG. 13 in principle is dynamically balanced.

As illustrated in FIG. 14, six accelerometers $A_x{}^1$, $A_x{}^2$, $A_y{}^1$, $A_y{}^2$, $A_z{}^1$ and $A_z{}^2$ are used in the PANVA mechanization. Again, the accelerometer pairs are vibrated at angular frequency $\omega$ and angular amplitude $\rho$. The accelerometer outputs contain $\Omega$ and F information as before but with different additional dynamic terms. As with the PAPVA mechanization of FIG. 13, the basic principle of signal separation is not changed. This mechanization also has the advantage of essentially perfect vehicular noise rejection.

In accordance with the arrangement shown in FIG. 14, the instantaneous distance of each accelerometer from the vehicular center of rotation is:

$$\begin{pmatrix} r_{A_x{}^1} \\ r_{A_x{}^2} \\ r_{A_y{}^1} \\ r_{A_y{}^2} \\ r_{A_z{}^1} \\ r_{A_z{}^2} \end{pmatrix} = \begin{pmatrix} L\cos\delta & 0 & l_z + L\sin\delta \\ -L\cos\delta & 0 & l_z - L\sin\delta \\ l_x + L\sin\delta & L\cos\delta & 0 \\ l_x - L\sin\delta & -L\cos\delta & 0 \\ 0 & l_y + L\sin\delta & L\cos\delta \\ 0 & l_y - L\sin\delta & -L\cos\delta \end{pmatrix} \begin{pmatrix} i \\ j \\ k \end{pmatrix} \quad (26)$$

Since, in this mechanization, the accelerometer input axes change direction with respect to the body axes, the sensed components are modulated. For example, the input axis varies in accordance with $\delta$: [Cos $\delta \cdot$i, O$\cdot$j, Sin $\delta \cdot$k].

Denoting the total acceleration that would be sensed along the body axes in the case of ideal parallel motion by $a_x'$, $a_y'$, and $a_z'$, the actual acceleration sensed by the angularly vibrating accelerometers is given by:

$$\begin{pmatrix} a_x^1 \\ a_x^2 \\ a_y^1 \\ a_y^2 \\ a_z^1 \\ a_z^2 \end{pmatrix} = \begin{pmatrix} \cos\delta & 0 & \sin\delta \\ -\cos\delta & 0 & -\sin\delta \\ \sin\delta & \cos\delta & 0 \\ -\sin\delta & -\cos\delta & 0 \\ 0 & \sin\delta & \cos\delta \\ 0 & -\sin\delta & -\cos\delta \end{pmatrix} \begin{pmatrix} a_{x'} \\ a_{y'} \\ a_{z'} \end{pmatrix} \quad (27)$$

With Equations (7)–(10) and substituting Equations (26) and (27) into Equation (1) and expanding, the actual accelerometer pair outputs for $a_x^1$ and $a_x^2$ can be represented by:

$$a_x^1 = F_x + l_z(pr + \dot{q}) - L(q^2 + r^2) + \quad (28)$$

$$\rho S\omega t \cdot pr + 2\omega \frac{\rho}{2} C\omega t \cdot q + \delta_M S\omega t[F_z - l_z(p^2 + q^2)] +$$

$$\tfrac{1}{2} \delta_M^2 S^2 \omega t[-F_x - l_z(pr + \dot{q}) - + 2L(r^2 - p^2)] - L\delta_M^2 \omega^2 C_2\omega t$$

$$a_x^2 = -F_x - l_z(pr + \dot{q}) - L(q^2 + r^2) + \quad (29)$$

$$\rho S\omega t \cdot pr + 2\omega \frac{\rho}{2} C\omega t \cdot q + + \delta_M S\omega t[-F_z + l_z(p^2 + q^2)] +$$

$$\tfrac{1}{2} \delta_M^2 S^2 \omega t[F_x + l_z(pr + \dot{q}) - -2L(r^2 - p^2)] - L\delta_M^2 \omega^2 C^2\omega t$$

Similar equations for $a_y^1$, $a_y^2$, $a_z^1$ and $a_z^2$ result from this substitution.

Since the PANVA mechanization of FIGS. 11 and 14 is back to back, the preprocessing operation of FIG. 19 for the PANVA arrangement is represented by the following matrix equation:

$$\begin{pmatrix} a_x^q \\ a_y^r \\ a_z^p \\ a_x^{F_x} \\ a_y^{F_y} \\ a_z^{F_z} \end{pmatrix} = \begin{pmatrix} 1 & 1 & 0 & 0 & 0 & 0 \\ 0 & 0 & 1 & 1 & 0 & 0 \\ 0 & 0 & 0 & 0 & 1 & 1 \\ \tfrac{1}{2} & -\tfrac{1}{2} & 0 & 0 & 0 & 0 \\ 0 & 0 & \tfrac{1}{2} & -\tfrac{1}{2} & 0 & 0 \\ 0 & 0 & 0 & 0 & \tfrac{1}{2} & -\tfrac{1}{2} \end{pmatrix} \begin{pmatrix} a_x^1 \\ a_x^2 \\ a_y^1 \\ a_y^2 \\ a_z^1 \\ a_z^2 \end{pmatrix} \quad (30)$$

Substituting Equations (28) and (29) along with similar equations for $a_y^1$, $a_y^2$, $a_z^1$ and $a_z^2$ into Equation (30) and assuming F and $\Omega$ constant throughout T, results in:

$$a_x^q = 2\omega\rho C\omega t \cdot q + \rho S\omega t \cdot pr - 2L(q^2 + r^2) + (\tfrac{1}{2})$$
$$\delta_M^2 S^2 \omega t [2r^2 L - 4L(p^2 + q^2)] - -2L \cdot \omega^2 \delta_M^2 C^2 \omega t \quad (31)$$

with similar equations for $a_y^r$ and $a_z^p$ and Equation (32) below for $a_x^{F_x}$ and similar equations for $a_y^{F_y}$ and $a_z^{F_z}$.

$$a_x^{F_x} = F_x + l_z pr + \delta_M S\omega t[F_z - l_z(p^2 + q^2)] + (\tfrac{1}{2})$$
$$\delta_M^2 S^2 \omega t[-F_x - l_z pr] \quad (32)$$

Substituting the equations for the angular rate component of the accelerations, such as Equation (31), and the equations for the force component of the accelerations, such as Equations (32), into Equations (22) and (23) results in:

$$p = p \quad (33)$$
$$q = q$$
$$r = r$$

$$\hat{F}_x = (F_x + l_z pr)\left(1 - \frac{\delta M^2}{4}\right) \quad (34)$$

$$\hat{F}_y = (F_y + l_x pq)\left(1 - \frac{\delta M^2}{4}\right)$$

$$\hat{F}_z = (F_z + l_y qr)\left(1 - \frac{\delta M^2}{4}\right)$$

Thus, in the PANVA mechanization, the angular rates are determined exactly, and specific forces are determined to a known scale factor.

From the above equations, it is apparent that in the back-to-back mechanizations, all vehicular noise is eliminated in the $\Omega$ channel. This is true for possible gradients or angular accelerations. Possible residual synchronous noise of the vibration axis, including angular noise normal to vibration axis, is also eliminated in the $\Omega$ channel. The back-to-back mechanizations are also sensitive to possible rectification effects in the F channel resulting from periodic components normal to the input axes of the accelerometer pairs. However, this effect can be compensated for electronically. Although the accelerometer pairs are subjected to centrifugal force due to the angular motion, the fact is that frequency $2\omega$ makes it possible to eliminate this effect in the processor of FIG. 19. The phase angle of signals in the processor will not have an effect here. However, at, for example, L=15 mm and $\delta=1/15$ rad and for $\omega=200$ 1/s, it amounts to 0.3 g, thus consuming part of the effective range of the accelerometer. It should be noted that residual harmonics in the S$\omega$t motion retain uneven in-phase components in the centripetal acceleration; thus, contributing to possible null point offset.

The PLNVA mechanisms shown in FIGS. 12 and 15 are similar to PANVA mechanisms except that motion of the accelerometers 320 and 322 is linear. In accordance with FIG. 15, the instantaneous distance to the vehicular center of rotation is:

$$\begin{pmatrix} rA_x^1 \\ rA_x^2 \\ rA_y^1 \\ rA_y^2 \\ rA_z^1 \\ rA_z^2 \end{pmatrix} = \begin{pmatrix} L & 0 & l_z + \frac{\rho}{2} S\omega t \\ -L & 0 & l_z + \frac{\rho}{2} S\omega t \\ l_x + \frac{\rho}{2} S\omega t & L & 0 \\ l_x - \frac{\rho}{2} S\omega t & -L & 0 \\ 0 & l_y + \frac{\rho}{2} S\omega t & L \\ 0 & l_y - \frac{\rho}{2} S\omega t & -L \end{pmatrix} \begin{pmatrix} i \\ j \\ k \end{pmatrix} \quad (35)$$

Substituting Equation (36) below into Equation (1) and expanding, the following equations for $a_x^1$ and $a_x^2$ result:

$$a_x^1 = F_x + l_z(pr + \dot{q}) + \frac{\rho}{2} S\omega t(pr + \dot{q}) + \quad (36)$$

$$2\omega \frac{\rho}{2} C\omega t \cdot q - L(q^2 + r^2)$$

$$a_x^2 = -F_x - l_z(pr + \dot{l}) + \frac{\rho}{2} S\omega t(pr + \dot{q}) + \quad (37)$$

$$2\omega \frac{\rho}{2} C\omega t \cdot q - L(q^2 + r^2)$$

with similar equations for $a_y^1$, $a_y^2$, $a_z^1$ and $a_z^2$ also resulting from the substitution.

Substituting Equations (36) and (37) along with the equations for $a_y^1$, $a_y^2$, $a_z^1$ and $a_z^2$ into Equation (30), and assuming F and $\Omega$ are constant throughout T, results in:

$$a_x^q = 2\omega\rho C\omega t \cdot q + \rho S\omega t \cdot pr - 2L(q^2 + r^2) \quad (38)$$

$$a_y^r = 2\omega\rho C\omega t \cdot r + \rho S\omega t \cdot pq - 2L(p^2 + r^2) \quad (39)$$

$$a_z^p = 2\omega\rho C\omega t \cdot p + \rho S\omega t \cdot qr - 2L(p^2 + q^2) \quad (40)$$

$$a_x^{Fx} = F_x + 1_z pr \quad (41)$$

$$a_y^{Fy} = F_y + 1_x pq \quad (42)$$

$$a_z^{Fz} = F_z + 1_z qr \quad (43)$$

Here p, q, r, $F_x$, $F_y$ and $F_z$ are obtained as before by substituting Equations (38)-(43) into Equations (22) and (23), respectively. The results are:

$$\begin{aligned} p &= p \\ q &= q \\ r &= r \\ F_x &= F_x + l_z pr \\ F_y &= F_y + l_x pq \\ F_z &= F_z + l_y qr \end{aligned} \quad (44)$$
$$\quad (45)$$

In this mechanization, therefore, all common mode vehicular noise components are essentially eliminated as in the PANVA mechanization. The small $\omega$ periodic deviation from exact colinearity of the input axes varies in accordance with S$\omega$t. Thus, possible noise due to angular acceleration is eliminated by the Sgn (C$\omega$t) operation of the processor in FIG. 19. Centripetal force due to the periodic excitation is nonexistent as in the PANVA mechanization.

Figure 16:
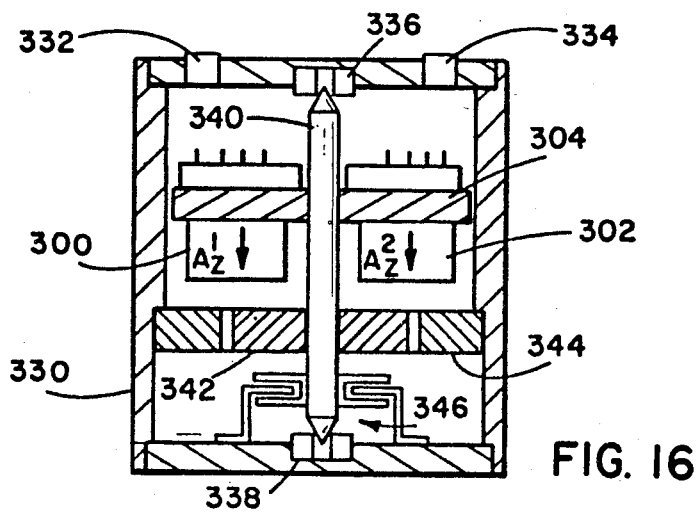
FIG. 16 is a side view of a mechanism for implementing the paired accelerometer arrangement of FIG. 10.
Figure 17:
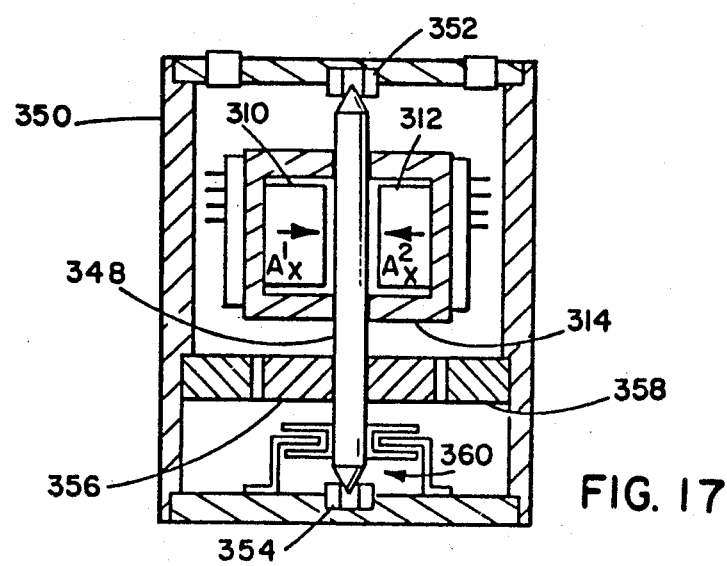
FIG. 17 is a side view of a mechanism for implementing the paired accelerometer arrangement of FIG. 11.
Figure 18:
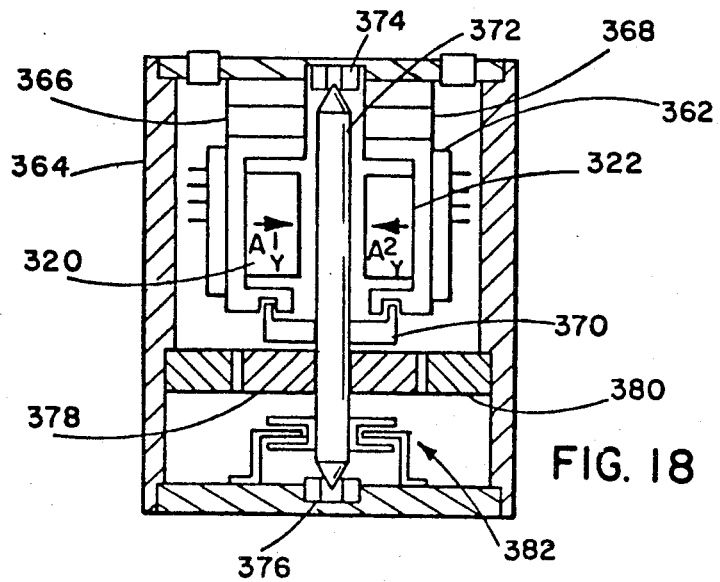
FIG. 18 is a side view of a mechanism for implementing the paired accelerometer arrangement of FIG. 12; and, FIG. 19 is a block diagram of a signal separating circuit of the type shown in FIG. 2 including the addition of a preprocessor circuit for summing and differencing the output signals of the accelerometers.

In FIGS. 16 through 18 are illustrated apparatus for implementing the PAPVA mechanization of FIG. 10, the PANVA mechanization of FIG. 11, and the PLNVA mechanization of FIG. 12, respectively. The apparatus for mechanizing the PAPVA mechanism is shown in FIG. 16 and includes a housing 330 having a pair of input/output plugs 332 and 334. Secured to the housing 330 by means of a pair of bearings or flexible joints 336 and 338 is a shaft 340. The paired accelerometers 300 and 302 are mounted on the accelerometer support frame or member 304 which in turn is secured to the shaft 340 for rotation therewith. Rotational vibration of the shaft 340 is provided by a motor that includes a rotor 342 connected to the shaft 340 and a stator 344 attached to the housing 330. Signals providing either position or velocity information for a feedback signal to a drive servo that would control the amplitude δ of the shaft 340 vibration can be obtained by the pick-off arrangement indicated generally at 346.

An apparatus for implementing the PANVA mechanization is provided in FIG. 17, wherein the accelerometers 310 and 312 are mounted on the support 314 which in turn is secured to a shaft 348. The shaft 348 is rotatably secured within a housing 350 by means of a pair of bearings or flexible joints 352 and 354. Angular vibration of the shaft 348 and, hence, the accelerometers 310 and 312 is provided by an electric motor which includes a rotor 356 secured to the shaft 348 and a stator 358 secured to the housing 350. Signals of the motion of the accelerometers 310 and 312 can be obtained by the pick-off arrangement indicated generally at 360 to provide negative feedback for a drive servo controlling the amplitude δ of the shaft 348 vibration.

An arrangement for implementing the PLNVA mechanization of FIG. 12 is illustrated in FIG. 18. In this particular implementation, linear translation of the accelerometers 320 and 322 along the axes 324 and 326, as shown in FIG. 12, is provided by a mechanism that includes a support frame 362 that holds the accelerometers 320 and 322 which is secured to a housing 364 by means of a pair of flexures 366 and 368. Abutting the lower portion of the accelerometer support frame 362 is a linkage element 370 that in turn is secured to a shaft 372. The shaft 372 is rotatably secured within the housing 364 by means of a pair of bearings or flexible joints 374 and 376. An electric motor including a rotor 378 attached to the shaft 372 and a stator 380 attached to the housing 364 will cause the shaft 372 to rotate or vibrate back and forth through a very limited angular rotation. As the shaft 372 rotates back and forth through a small angle, the linkage element 370 will cause the accelerometers 320 and 322 to move in directions essentially normal to the force sensing-axes $A_y^1$ and $A_y^2$. As a result, substantially linear movement of the accelerometers 320 and 322 can be achieved in a direction normal to their force-sensing axes by using the mechanism of FIG. 18. Signals representing angular position or velocity of the shaft for use by a drive servo can be obtained by means of the pick-off arrangement indicated generally at 382.

The preferred embodiment of a signal processor for separating the force signals F from the angular rate signals $\Omega$ for the paired accelerometer mechanizations of FIGS. 10 through 13 is illustrated in FIG. 19. The basic operation of the processor circuit shown in FIG. 19 is the same as the signal separation circuit of FIG. 2. For example, the control pulse generator 2 is the same as shown in FIG. 2 with a line 384 connecting the square wave generator 22, as shown in FIG. 2, to the drive signal generator 31. In a similar manner, the output of the reset and integrate control pulse generator 23 is transmitted on a line 386 from the control pulse generator 2, and the output of the sampling and pulse generator 24 is transmitted on a line 388. Since the paired accelerometer mechanizations make use of two accelerometers, there are two accelerometer assemblies 390 and 392 shown in FIG. 19 that correspond to accelerometers 300 and 302 in FIG. 10 and accelerometers 310 and 312 in FIG. 11 and accelerometers 320 and 322 in FIG. 12. Accelerometer output signals $a_z^1$ and $a_z^2$ are output from the accelerometer assemblies 390 and 392 on a pair of lines 394 and 396, respectively.

Signal separation is performed in the circuit of FIG. 19 generally by the same means as the circuit in FIG. 2 except that the force channel producing the $F_z$ signal on a line 398 and the angular rate channel for producing the $\rho$ signal on a line 400 are represented in FIG. 19 as two separate circuits. As shown in FIG. 19, a force channel circuit 402 includes the integrating circuit 44 and the sample-and-hold circuit 45 of the electronic signal separation processor 4 of FIG. 2, with the signals on lines 386 and 388 being applied to the integrating circuit 44 and the sample-and-hold circuit 45 as shown in FIG. 2. In a similar manner, an angular rate channel circuit 404 includes the integrating circuit 42 and the sample-and-hold circuit 43 of FIG. 2, as well as the sign switching or multiplying circuit 41. The signals on lines 386 and 388 are applied to the integrating circuit 42 and the sample-and-hold circuit 43, as well as the pulse signal on line 384 in the same manner as shown in FIG. 2.

One of the key advantages of the paired accelerometer mechanization is the ability to use sum and difference techniques to separate those signals which pertain primarily to translational motion from the signals which pertain primarily to angular motions. To be able to cancel linear specific force signals that are output from paired accelerometers, it is necessary that the force-sensing axes be nearly as parallel as possible and that the effective centers of mass be close together as well. Whether the force-sensing axes of the accelerometers are in the same or opposite directions is a matter of convenience in designing the mounting of the accelerometers. In either case, the separation process is made possible by designing the mechanism that produces the vibratory motion so that the driven velocity factors are at all times equal and opposite when measured in the frame of reference of the housing.

A preprocessor circuit for performing the sum and difference functions is illustrated in the dashed line 406 of FIG. 19. The preseparation or preprocessor circuit 406 includes two summing junctions 408 and 410. The particular preprocessing circuit 406 shown in FIG. 9 is utilized for mechanizations where the force-sensing axes are in the same direction, such as in the PAPVA mechanization shown in FIG. 10 and, as such, implements the logic of Equation (17). Here the summing junction 408 acts to provide a signal to the force channel 402 that represents the sum of the accelerometer signals on lines 394 and 396. In a similar manner, the summing junction 410 provides a signal to the angular rate channel 404 that represents the difference between the accelerometer signals on lines 394 and 396. It is assumed that the nonrotational specific force signals will be substantially equal on lines 394 and 396 so that the summed signal on line 412 will, in effect, provide twice the sensitivity for the specific force being measured by accelerometers along the force-sensing axes. Likewise, the difference signal on line 414 will be substantially free of components representing specific force. Conversely, a purely rotational motion will produce two sinusoidal Coriolis accelerations along the force-sensitive axes of the accelerometers with a phase difference of 180°. This phase difference occurs because the Coriolis accelerations are the vector product of angular rate and relative velocity and, in this case, the angular rate is common, while the relative velocities are 180° out of phase. As a result, the output of the summing junction 408 on line 412 will be substantially free of components representing angular rotation. For the same reason, the output of the summing junction 410 on line 414 will provide a signal to the angular rate channel 404 with twice the sensitivity for angular rate.

In the mechanizations, such as the PANVA of FIG. 11 and the PLNVA of FIG. 12, where the force-sensing axes have the opposite sense, the same principles apply except, of course, the signs of the signals are reversed. Thus, in the preprocessor 406 for the PANVA and the PLNVA mechanizations, the summing junction 408 would difference the acceleration signals on lines 394 and 396 and the summing junction 410 would add the signals on lines 394 and 396 conforming generally to the relations expressed in Equation (30). As a result, the summed signal from summing junction 410 will contain angular rate information only while the difference signal from summing junction 408 contains specific force information only. Therefore, it may be seen that the preprocessor 406 has the effect of separating the specific force signal from the angular rate signal before the signals are applied to the force channel 402 and the angular rate channel 404.

A further advantage of the circuit arrangement shown in FIG. 19 is that the sum and difference techniques provided by the preprocessor 406 can be used to facilitate the scaling of the signals applied to the force channel 402 and the angular rate channel 404. Scaling is illustrated by means of a pair of scaling amplifiers 416 and 418. The scaling amplifiers 416 and 418 can be used to scale the level of signals being applied to the force channel 402 and the angular rate channel 404 without concern for the magnitude of the signal output from the accelerometers. This is particularly important when one considers that the amplitudes of the signals representing specific force $F_z$ may be up to 100 times greater than the signal amplitudes relating to angular rate $\rho$. Thus, the values of the amplifier gain constants $K_F$ and $K_\Omega$ can be adjusted to the expected signal amplitudes on lines 412 and 414 to permit the maximum resolution of the signals without overranging the circuits 402 and 404. Similarly, Inertial Navigation System gains $K_F$ and $K_\Omega$ can be switched to increase sensitivity and, hence, to improve resolution during the navigation system adjustment process. During a mission, it may be necessary to temporarily reduce the sensitivity of either the force-sensing or rate-sensing channels to avoid overranging the circuits 402 and 404 during transient maneuvers of the vehicle containing the navigation system.

$F_z$ and p have been chosen by way of illustration of one of the component pairs of F and $\Omega$. Identical consideration pertain to $F_x$ and q and $F_y$ and r.

Since one of the principal uses of the rate signals $\Omega$ produced by the accelerometer systems discussed above is in Inertial Navigation Systems, the effect of noise and error signals on the navigation system is a significant concern. As it turns out, accelerometer noise present in the output of the angular rate channel 404 is a principal factor in the accuracy of an Inertial Navigation System using accelerometers to determine angular rate. The effect of accelerometer noise for a given accelerometer level of noise is inversely proportional to the vibration amplitude. It has been found, for example, utilizing the QA-2000 accelerometer commercially available from Sundstrand Data Control, Inc., the positional error is about two nautical miles per hour for a vibration amplitude of approximately 1.25 mm.

I claim:

1. Apparatus for measuring the specific force and angular rate of a moving body, by means of a plurality of accelerometers mounted on mutually perpendicular axes and cyclically driven by drive means in mutually perpendicular planes to produce output signals comprised of the specific force and angular rate, characterized in that:

each accelerometer defines a force-sensing axis and a mass, each accelerometer is mounted for vibratory movement along a first vibration axis which is substantially perpendicular to its force sensing axis in its respective plane;

each accelerometer is vibrated by said drive means along its first axis;

each accelerometer is joined to a counterbalancing mass for counterbalancing the mass of the accelerometer; and each accelerometer is connected to processor means for generating, from the output of the accelerometer and the angular rate "ω" of vibration of the accelerometer, the specific force and angular rate vector of the moving body using the function "sgn cos ω".

2. The apparatus according to claim 1, wherein each of said accelerometers is resiliently mounted by resilient means constraining it to move only along its respective axis of vibration;

said drive means being connectable to a source of sinusoidal current for vibrating each accelerometer along its axis of vibration.

3. The apparatus according to claim 2, further including a housing, said drive means comprising, for each accelerometer, a magnet and a driving coil, one of which is secured to its respective accelerometer and the other of which is secured to said housing.

4. The apparatus according to claim 3, wherein each of said magnets is fixed to said housing and is formed with a cylindrical air gap coaxial with the axis of vibration of its respective accelerometer, and wherein each of said driving coils is carried on a cylindrical bobbin fixed to its respective accelerometer coaxial with its axis of vibration and receivable within said cylindrical air gap.

5. The apparatus according to claim 2, wherein each of said accelerometers further includes pick-off means for measuring the rate of displacement of its respective accelerometer along its axis of vibration.

6. The apparatus according to claim 5, wherein each of said pick-off means comprises a fixed magnet formed with a cylindrical air gap coaxial with the axis of vibration of its accelerometer, and a pick-off coil carried on a cylindrical bobbin on its respective accelerometer coaxial with its axis of vibration and receivable within said air gap.

7. The apparatus according to claim 5, further including a differential amplifier connected between said source of sinusoidal current and each accelerometer, pick-off means, the apparatus further including an electrical connection from the electrical output of each accelerometer motion pick-off means to its differential amplifier providing a negative feedback loop to its drive means.

8. The apparatus according to claim 2, wherein each of said mutually perpendicular axes includes an accelerometer mounted in a coaxial back-to-back relationship with its counterbalancing mass and with the drive means vibrating them in synchronism, but in opposite directions, whereby said counterbalancing mass serves to dynamically balance its accelerometer.

9. The apparatus according to claim 1, wherein each accelerometer is mounted on a supporting member which is rotatable about a rotational axis perpendicular to said first axis of vibration;

wherein said drive means, for each accelerometer, comprises an electrical motor including a stator and a rotor secured to said supporting member; and wherein each accelerometer further including pick-off means comprising a pick-off rotor secured to said supporting member, and a pick-off stator.

10. The apparatus according to claim 1, wherein each accelerometer is connected to its counterbalancing mass by a supporting member so as to form a tuning fork, each tuning fork having first and second prongs adapted to vibrate at a predetermined natural frequency, each accelerometer being mounted for vibratory movement on said first prong, said counterbalancing mass functioning as a second prong to cause the two prongs to vibrate at said predetermined natural frequency.

11. The apparatus according to claim 10, wherein one of said prongs of each tuning fork includes drive means for vibrating the same, and the other prong includes pick-off means for measuring the rate of displacement of the accelerometer mass and for outputting an electrical signal corresponding to said measurement.

12. The apparatus according to claim 11, wherein each tuning fork is mounted within a housing; said drive means for each accelerometer comprising a driving coil and a permanent magnet, one fixed to said one prong and the other fixed to said housing; said pick-off means comprising a pick-off coil and a permanent magnet, one fixed to said other prong and the other fixed to said housing.

13. The apparatus according to claim 12, wherein said coils of both the drive means and the pick-off means are fixed to the inner faces of their respective prongs, the outer face of said one prong carrying its respective accelerometer mass, the outer face of said other prong carrying its respective counterbalancing mass.

14. The apparatus according to claim 10, wherein each of said tuning forks includes an electrical driving member carried on one prong and an electrical pick-off member carried on the other prong, there being an electrical feedback loop from the pick-off member to the drive member to form therewith an electromechanical oscillator whose oscillations are sustained by said feedback loop.

15. Apparatus for measuring the angular rate of a moving body by means of a plurality of accelerometers which are mounted on mutually perpendicular axes and which are cyclically driven by drive means in mutually perpendicular planes to produce output signals representative of the angular rate of the moving body, characterized in that:

each of said accelerometers has a force-sensing axis and generates an output signal "a" representing acceleration of the accelerometer along said force-sensing axis, each of said accelerometers being mounted for vibratory movement along a vibrating axis which is substantially perpendicular to said force-sensing axis in its respective plane;

each of said accelerometers in vibrated along said vibrating axis in its respective plane at a predetermined frequency "ω" by a tuning fork, said tuning fork having first and second prongs which are adapted to vibrate at a predetermined natural frequency, each accelerometer being mounted for vibratory movement on said first prong, said second prong including a counterbalancing mass to cause the two prongs to vibrate at said predetermined natural frequency, each tuning fork including an electrical driving member carried on one prong and an electrical pick-off member carried on the other prong, there being an electrical feedback loop from said pick-off member to said driving member to form therewith an electromechanical oscillator whose oscillations are sustained by said feedback loop; and said accelerometer output signals are converted by a processor to derive a signal corresponding to the angular rate vector "Ω" from a product signal equal to "a sgncos ωt" and the integral of said product signal over the cyclic period, and to derive the specific force vector "F" from the integral of "a" over the cyclic period.

16. An accelerometer assembly particularly useful for measuring the angular rate and specific force of a moving body, said assembly having a processor characterized by "a sgncos ωt" where "a" is the output of the accelerometer and "ω" is the cyclic frequency at which the accelerometer is driven, comprising:
a supporting member;
an accelerometer mounted on the body for vibratory movement along an axis of vibration, said accelerometer having a mass and being mounted on said supporting member to be rotatable about a rotational axis perpendicular to its axis of vibration;
acceleration means for generating an output signal representing acceleration of the accelerometer along a predetermined force-sensing axis;
drive means for vibrating said accelerometer along said axis of vibration at an angular frequency, said drive means oscillating said supporting member through a small angular motion about said rotational axis; and
a counterbalancing mass, carried by said supporting member on the opposite side of said rotational axis of said accelerometer, for counterbalancing the mass of the accelerometer.

17. An assembly according to claim 16, wherein said accelerometer is resiliently mounted by resilient means constraining the accelerometer mass to move only along said axis of vibration, said drive means being connectable to a source of sinusoidal current for vibrating the accelerometer mass along its axis of vibration.

18. An assembly according to claim 17, further including a housing wherein said drive means comprises a magnet and a driving coil adapted to be connected to said source of sinusoidal current, one of said latter being secured to said mass, and the other being secured to said housing.

19. An assembly according to claim 18, wherein said magnet is in the form of a permanent magnet fixed to said housing and formed with a cylindrical air gap coaxial with said axis of vibration, said driving coil being carried on a cylindrical bobbin fixed to said mass coaxial with said axis of vibration and receivable within said cylindrical air gap.

20. An assembly according to claim 17, further including pick-off means disposed within said housing and coupled to said mass for measuring the rate of displacement thereof along said axis of vibration.

21. An assembly according to claim 17, wherein said accelerometer mass is mounted in a coaxial back-to-back relationship with said counterbalancing mass, said drive means vibrating the two masses in synchronism, but in opposite directions, whereby one mass serves to dynamically balance the other mass.

22. An assembly according to claim 16, wherein said drive means, for said accelerometer, comprises an electrical motor including a stator and a rotor secured to said supporting member, said accelerometer further including pick-off means comprising a pick-off rotor secured to said supporting member and a pick-off stator.

23. An accelerometer assembly particularly useful for measuring the angular rate of a moving body, comprising:
two accelerometers carried by said moving body;
accelerometer means for generating accelerometer output signals representing acceleration of each accelerometer along a predetermined force-sensing axis, each accelerometer being mounted for vibratory movement along an axis of vibration substantially perpendicular to said force-sensing axis;
drive means for vibrating said accelerometers at an angular frequency along said axis of vibration; and
signal processing means for separating from said accelerometer output signals an angular rate signal representing the angular rate of the moving body, said processing means including:
(a) multiplying means for multiplying each of said accelerometer output signals by a zero-mean periodic function of said angular frequency;
(b) rate integrating means, operatively connected to said multiplying means, for generating a rate integrated signal representing the integration of the resulting product of said periodic function and said accelerometer output signals over the period of said periodic frequency; and
(c) rate sample means, responsive to said rate integrated signal, for generating the angular rate of said moving body.

24. The apparatus of claim 23, wherein said signal processing means additionally includes force channel means for generating a force signal representing the acceleration of the apparatus along said force-sensing axis wherein said force channel means includes:
force integrating means for periodically integrating said accelerometer output signal over the time period T at said frequency ω to produce an integrated force signal F; and
force sample means responsive to said force integrated signal for generating said force signal.

25. The apparatus of claim 24, including a source of integrator control pulses operatively connected to said rate integrating means and said force integrating means.

26. An apparatus for generating a signal representing the angular rate motion of a structure, comprising:
a first accelerometer including means for generating a first output signal representing acceleration along a first force-sensing axis;
a second accelerometer including means for generating a second output signal representing acceleration along a second force-sensing axis;
alignment means for aligning said first accelerometer with respect to said second accelerometer, such that said first force-sensing axis is substantially parallel with said second force-sensing axis;
vibration means operatively connected to the structure and said alignment means for angularly vibrating said first and second accelerometers with respect to the structure at an angular frequency and in a direction substantially perpendicular to said first and second force-sensing axis; and
signal processing means responsive to said first and second output signals for generating a rate signal representing the angular rate motion of the structure about an axis perpendicular to the plane of said force-sensing axes and said vibrating direction and a specific force signal representing the linear acceleration of the structure along said force-sensing axes.

27. The apparatus of claim 26, wherein the amplitude of the angular vibration is sufficiently small such that said accelerometers can be considered to vibrate along two parallel lines.

28. The apparatus of claim 27, wherein said first and said second accelerometers are aligned by said alignment means such that said first and said second force-sensing axes are opposite and are substantially coaxial with each other.

29. The apparatus of claim 28, wherein the amplitude of vibration is approximately 2 millimeters peak-to-peak.

30. The apparatus of claim 26, wherein said first and said second accelerometers are aligned by said alignment means such that said first and second force-sensing axes are parallel to the axis of angular vibration.

31. The apparatus of claim 30, wherein said first and second force-sensing axes are substantially equidistant from the axes of angular vibration.

32. The apparatus of claim 26, wherein said first and second accelerometers are aligned by said alignment means such that said first and said second force-sensing axes are opposite and substantially coaxial with each other.

33. The apparatus of claim 32, wherein the axis of angular vibration is perpendicular to said first and said second force-sensing axes and located between said first and said second accelerometers.

34. The apparatus of claim 26, wherein the angle of vibration is approximately 50 milliradians peak-to-peak.

35. The apparatus of claim 26, additionally including a preprocessor means operatively connected between said first and said second accelerometers and said signal processing means for applying the sum of said first and said second output signals to said signal processor means.

36. The apparatus of claim 35, wherein said preprocessor means additionally applies the difference of said first and said second output signals to said signal processor means.

37. The apparatus of claim 26, wherein said signal processing means includes a force channel means responsive to said first and second output signals for generating a force signal representing the acceleration of the apparatus along said force-sensing axes and a rate channel means responsive to said first and second output signals for generating said rate signal.

38. The apparatus of claim 37, additionally including preseparation means operatively connected between said first and second accelerometers and said signal processing means for combining said first and said second output signals into a first combination signal for input to said force channel means and for combining said first and said second output signals into a second combination signal for input to said rate channel means.

39. The apparatus of claim 38, wherein said first and said second force-sensing axes are aligned in the same direction and wherein said first combination signal is functionally related to the sum of said first and said second output signals and said second combination signal is functionally related to the difference between said first and said second output signals.

40. The apparatus of claim 38, wherein said first and said second force-sensing axes are aligned in opposite directions and wherein said first combination signal is functionally related to the difference between said first and said second output signals and said second combination signal is functionally related to the sum of said first and said second output signals.

41. The apparatus of claim 26, additionally including pick-off means for generating a pick-off signal representing the velocity of said first and second accelerometers in said direction of vibration and servo means responsive to said pick-off signal for controlling the amplitude of said vibration.

42. The apparatus of claim 26, additionally including pick-off means for generating a pick-off signal representing the location of said first and second accelerometers along said direction of vibration and servo means responsive to said pick-off signal for controlling the amplitude of said vibration.

43. The apparatus set forth in claim 26, wherein said signal processing means includes:
(a) sign switching means for multiplying said first and said second output signals by a zero-mean periodic function of said angular frequency;
(b) rate integrating means, operatively connected to said multiplying means, for generating a rate integrated signal representing the integration of the resulting product of said periodic function and said first and second output signals over the period of said angular frequency; and
(c) rate sample means responsive to said rate integrated signal, for generating said rate signal.

44. The apparatus of claim 43, including a source of frequency signals at said frequency $\omega$ operatively connected to said vibration means and said signal processing means wherein the deviation of said frequency $\omega$ is less than one part in $10^6$.

45. The apparatus of claim 44, wherein said source of frequency signals is a crystal-controlled signal source.

46. The apparatus of claim 43, wherein said signal processing means additionally includes force channel means for generating a force signal representing the acceleration of the apparatus along said force-sensing axes wherein said force channel means includes:
force integrating means for periodically integrating said first and said second output signals over the time period T at said frequency $\omega$ to produce an integrated force signal F; and,
force sample means responsive to said force integrated signal for generating said force signal.

47. The apparatus of claim 44, including a source of integrator control pulses operatively connected to said rate integrating means and said force integrating means.

48. The apparatus of claim 43, including preseparation means operatively connected between said first and second accelerometers and said multiplying means for combining said first and said second output signals into a combination signal for input to said multiplying means.

49. The apparatus of claim 48, wherein said first and said second force-sensing axes are aligned in the same direction and wherein said combination signal is functionally related to the difference between said first and said second output signals.

50. The apparatus of claim 48, wherein said first and said second force-sensing axes are aligned in opposite directions and wherein said combination signal is functionally related to the sum of said first and said second output signals.

51. The apparatus of claim 46, including preseparation means operatively connected between said first and second accelerometers and said multiplying means and said force integrating means for combining said first and said second output signals into a first combination signal for input to said multiplying means and for combining said first and second output signals into a second combination signal for input into said force integrating means.

52. The apparatus of claim 51, wherein said first and said second force-sensing axes are aligned in opposite directions and wherein said first combination signal is functionally related to the sum of said first and said second output signals and said second combination signal is functionally related to the difference between said first and said second output signals.

53. The apparatus of claim 51, wherein said first and said second force-sensing axes are aligned in the same direction and wherein said first combination signal is functionally related to the difference of said first and said second output signals and said second combination signal is functionally related to the sum between said first and said second output signals.

54. An angular rate sensing accelerometer structure of the type having a processor characterized by the mathematical function "a sgncos ωt" where "a" is the output of the accelerometer and "ω" is the cyclic frequency at which the acclerometer is driven so as to compute the angular rate and specific force of the body to which the acclerometer structure is attached, comprising:
   a housing;
   a shaft having an axis freely rotatably mounted in said housing;
   a support member secured to said shaft;
   two accelerometers each of which is secured to said support member; and
   vibrating means for vibratorily moving said shaft through a predetermined angular displacement about said axis.

55. The structure of claim 54, wherein said accelerometers are secured to said support member such that the force-sensing axis of each accelerometer is parallel to said shaft.

56. The structure of claim 54, wherein said accelerometers are secured to said support member such that the force-sensing axis of each are parallel to each other and normal to said shaft axis.

57. The structure of claim 54, wherein said vibrating means includes an electric motor having a rotor secured to said shaft and a stator secured to said housing.

58. The structure of claim 57, additionally including pick-off means connected between said shaft and said housing.

59. An angular rate sensing accelerometer structure comprising:
   a housing;
   a shaft having an axis rotably mounted in said housing;
   a first support member;
   a first accelerometer secured to said support member;
   first flexure means for securing said first support member to said housing such that said first accelerometer can move in a direction normal to said shaft axis;
   a second support member;
   a second accelerometer secured to said second support member;
   second flexure means for securing said second support member to said housing such that said second accelerometer can move in a direction normal to said shaft axis;
   vibrating means for rotationally vibrating said shaft; and,
   linkage means connected between said shaft and said first and second support members for vibrating said accelerometers along as axis substantially normal to said shaft axis.

60. The structure of claim 59, wherein each accelerometer defines a force-sensing axis, and wherein the force-sensing axes of said accelerometers are parallel.

61. The structure of claim 60, wherein said vibrating means includes an electric motor having a rotor secured to said shaft and a stator secured to said housing.

62. The structre of claim 60, wherein said linkage means includes first and second linkage members secured to said shaft and disposed to said first and second support members, respectively.

* * * * *

UNITED STATES PATENT AND TRADEMARK OFFICE
CERTIFICATE OF CORRECTION

PATENT NO. : 4,590,801
DATED : May 27, 1986
INVENTOR(S) : Shmuel J. Merhav

It is certified that error appears in the above-identified patent and that said Letters Patent are hereby corrected as shown below:

In Column 1, lines 29 through 31, delete " the copending patent application...of this specification" and insert --U.S. Patent 4,445,376--.

In Column 1, line 36, delete "application".

In Column 1, line 43, delete "in that patent application" and insert --in U.S. Patent 4,445,376--.

In Column 1, line 44, delete "application".

In Column 1, line 59, delete "that patent application" and insert --U.S. Patent 4,445,376--.

In Column 1, line 65, delete "that patent application" and insert --U.S. Patent 4,445,376--.

UNITED STATES PATENT AND TRADEMARK OFFICE
CERTIFICATE OF CORRECTION

PATENT NO. : 4,590,801
DATED : May 27, 1986
INVENTOR(S) : Shmuel J. Merhav

Page 2 of 5

It is certified that error appears in the above-identified patent and that said Letters Patent are hereby corrected as shown below:

In Column 6, line 35, delete "the above cited patent application" and insert --U.S. Patent 4,445,376--.

In Column 6, line 41, delete "the above cited patent application" and insert --U.S. Patent 4,445,376--.

In Column 7, line 31, delete "(6)-(8)".

In Column 7, line 58, delete "44" and insert --45--.

In Column 9, line 38, change "64" to --54--.

In Column 10, line 20, change "generating" to --generates--.

UNITED STATES PATENT AND TRADEMARK OFFICE
CERTIFICATE OF CORRECTION

PATENT NO. : 4,590,801
DATED : May 27, 1986
INVENTOR(S) : Shmuel J. Merhav

Page 3 of 5

It is certified that error appears in the above-identified patent and that said Letters Patent are hereby corrected as shown below:

In Column 11, line 25, change "$10^5 \div 10^6$ to --$10^5$ to $10^6$--.

In Column 12, lines 40-41 after "amplitude", delete " " and insert --$\Psi$--.

In Column 13, line 53, delete "this" and insert --its--.

In Column 15, line 48, delete "prove" and insert --provide--.

In Column 17, Equation (22) change:
"$a_z$" to --$a_z^p$--;
"$a_x$" to --$a_x^q$--; and
"$a_y$" to --$a_y^r$--.

In Column 17, line 61, delete "p, q and r" and insert --$a_z^p, a_x^q$, and $a_y^r$--.

UNITED STATES PATENT AND TRADEMARK OFFICE
CERTIFICATE OF CORRECTION

PATENT NO. : 4,590,801
DATED : May 27, 1986
INVENTOR(S) : Shmuel J. Merhav

It is certified that error appears in the above-identified patent and that said Letters Patent are hereby corrected as shown below:

In Column 17 and 18, Equation (23) change:

"$a_x$" to --$a_x^{Fx}$--;
"$a_y$" to --$a_y^{Fy}$--; and
"$a_z$" to --$a_z^{Fz}$--.

In Column 18, line 9, delete "$F_x$, $F_y$ and $F_z$ are substituted in Equation (21)" and insert --$a_x^{Fx}$, $a_y^{Fy}$ and $a_z^{Fz}$ in Equation (21) are substituted--.

In Column 19, Equation (28), the third line, change "-+" to --+--.

In Column 19, Equation (29), the third line, change "--" to --+--.

In Column 19, Equation (31), line 2, change $[2r^2L-4L(p^2+q^2)]$ to --$[4L(r^2-p^2)]$--

UNITED STATES PATENT AND TRADEMARK OFFICE
CERTIFICATE OF CORRECTION

PATENT NO. : 4,590,801
DATED : May 27, 1986
INVENTOR(S) : Shmuel J. Merhav

It is certified that error appears in the above-identified patent and that said Letters Patent is hereby corrected as shown below:

Column 20, line 54, "(36) below" should read -- (35) above --.

Column 21, Equation (43), "$l_z$" should read -- $l_y$ --.

Column 23, line 17, "factors" should read -- vectors --.

Signed and Sealed this

Eighteenth Day of August, 1987

*Attest:*

DONALD J. QUIGG

*Attesting Officer*      *Commissioner of Patents and Trademarks*